United States Patent
Simpson et al.

(10) Patent No.: US 10,841,268 B2
(45) Date of Patent: Nov. 17, 2020

(54) METHODS AND APPARATUS TO GENERATE VIRTUAL WAR ROOMS VIA SOCIAL MEDIA IN ENTERPRISE NETWORK ENVIRONMENTS

(71) Applicant: VMware, Inc., Palo Alto, CA (US)

(72) Inventors: Glen Robert Simpson, Sunnyvale, CA (US); Didier Giannesini, Eastwood (AU); Clive Ilan Ross, Ashbury (AU)

(73) Assignee: VMware, Inc., Palo Alto, CA (US)

( * ) Notice: Subject to any disclaimer, the term of this patent is extended or adjusted under 35 U.S.C. 154(b) by 694 days.

(21) Appl. No.: 14/817,899

(22) Filed: Aug. 4, 2015

(65) Prior Publication Data
US 2017/0041435 A1  Feb. 9, 2017

(51) Int. Cl.
| | |
|---|---|
| H04L 12/58 | (2006.01) |
| H04L 12/26 | (2006.01) |
| H04L 12/24 | (2006.01) |
| H04L 29/06 | (2006.01) |
| G06Q 50/00 | (2012.01) |
| G06Q 10/10 | (2012.01) |

(52) U.S. Cl.
CPC .......... *H04L 51/32* (2013.01); *H04L 41/5006* (2013.01); *H04L 43/0817* (2013.01); *H04L 43/16* (2013.01); *H04L 67/38* (2013.01); *G06Q 10/10* (2013.01); *G06Q 50/01* (2013.01)

(58) Field of Classification Search
CPC ..................................................... H04L 67/38
USPC ......................................................... 709/224
See application file for complete search history.

(56) References Cited

U.S. PATENT DOCUMENTS

| | | |
|---|---|---|
| 6,574,628 B1 | 6/2003 | Kahn et al. |
| 6,978,379 B1 | 12/2005 | Goh et al. |
| 8,356,067 B2 | 1/2013 | Trantow |
| 8,521,725 B1 | 8/2013 | Pearson et al. |
| 8,745,401 B1 | 6/2014 | Hintz et al. |
| 8,868,590 B1 | 10/2014 | Donneau-Golencer |
| 8,996,687 B2 | 3/2015 | Zadig |
| 9,223,852 B2 | 12/2015 | Lopitaux et al. |

(Continued)

OTHER PUBLICATIONS

United States Patent and Trademark Office, "Non-final Office Action," issued in connection with U.S. Appl. No. 14/788,413, dated Dec. 14, 2016 (10 pages).

(Continued)

*Primary Examiner* — Sm A Rahman
*Assistant Examiner* — Emad Siddiqi
(74) *Attorney, Agent, or Firm* — Hanley, Flight & Zimmerman, LLC

(57) ABSTRACT

An example method to generate communication clients in an enterprise network environment involves receiving a status from a resource management system, the status associated with a computing resource of the enterprise network environment. The example method involves determining whether the status satisfies a threshold. When the status satisfies the threshold, the example method involves selecting a plurality of users based on a status agreement. When the status satisfies the threshold, the example method involves generating a communication client associated with the resource. When the status satisfies the threshold, the example method involves inviting the selected plurality of users via a social media interface to access the communication client.

18 Claims, 7 Drawing Sheets

(56) References Cited

U.S. PATENT DOCUMENTS

| | | | |
|---|---|---|---|
| 9,577,896 | B2 | 2/2017 | Zadig |
| 10,075,442 | B2 | 9/2018 | Simpson et al. |
| 10,250,539 | B2 | 4/2019 | Simpson et al. |
| 10,257,143 | B2 | 4/2019 | Simpson et al. |
| 10,467,300 | B1 | 11/2019 | Jastrzebski et al. |
| 2006/0143057 | A1 | 6/2006 | Sadiq |
| 2008/0046394 | A1 | 2/2008 | Zhou et al. |
| 2011/0202439 | A1 | 8/2011 | Ricci |
| 2011/0276601 | A1 | 11/2011 | Pin et al. |
| 2011/0302098 | A1 | 12/2011 | Yoshida et al. |
| 2012/0116982 | A1 | 5/2012 | Yoshida et al. |
| 2012/0310922 | A1 | 12/2012 | Johnson et al. |
| 2013/0091582 | A1 | 4/2013 | Chen et al. |
| 2013/0218885 | A1 | 8/2013 | Satyanarayanan |
| 2013/0262598 | A1 | 10/2013 | Makanawala et al. |
| 2014/0041055 | A1 | 2/2014 | Shaffer et al. |
| 2014/0181817 | A1 | 6/2014 | Muller et al. |
| 2014/0245141 | A1 | 8/2014 | Yeh et al. |
| 2014/0280185 | A1 | 9/2014 | Nordstrom |
| 2014/0280595 | A1* | 9/2014 | Mani ............... H04L 67/10 709/204 |
| 2014/0337914 | A1 | 11/2014 | Canning et al. |
| 2015/0066624 | A1 | 3/2015 | Astore |
| 2015/0127406 | A1 | 5/2015 | Hoen, IV et al. |
| 2015/0161260 | A1 | 6/2015 | Balani et al. |
| 2015/0161560 | A1 | 6/2015 | Burckart et al. |
| 2015/0213083 | A1 | 7/2015 | Brooks et al. |
| 2015/0358303 | A1 | 12/2015 | Hui et al. |
| 2015/0379277 | A1 | 12/2015 | Thota et al. |
| 2016/0021037 | A1 | 1/2016 | Hewitt et al. |
| 2016/0036860 | A1 | 2/2016 | Xing et al. |
| 2016/0094507 | A1 | 3/2016 | Li et al. |
| 2016/0110810 | A1 | 4/2016 | Ashok et al. |
| 2016/0127553 | A1* | 5/2016 | McCormack ....... H04M 3/5232 379/265.03 |
| 2016/0189315 | A1 | 6/2016 | Anania et al. |
| 2016/0226719 | A1* | 8/2016 | Ong ................ G06Q 10/101 |
| 2016/0234250 | A1 | 8/2016 | Ashley et al. |
| 2016/0283983 | A1 | 9/2016 | Kalb et al. |
| 2016/0328758 | A1 | 11/2016 | Rasansky |
| 2017/0004182 | A1 | 1/2017 | Simpson et al. |
| 2017/0005967 | A1 | 1/2017 | Simpson et al. |
| 2017/0041265 | A1 | 2/2017 | Simpson et al. |
| 2017/0134903 | A1 | 5/2017 | Zadig |
| 2017/0180320 | A1 | 6/2017 | Nimmagadda et al. |
| 2018/0063103 | A1 | 3/2018 | Jahid et al. |
| 2018/0063193 | A1 | 3/2018 | Chandrashekhar et al. |
| 2018/0069899 | A1 | 3/2018 | Lang et al. |
| 2018/0137121 | A1 | 5/2018 | Agarwal |

OTHER PUBLICATIONS

United States Patent and Trademark Office, "Non-final Office Action," issued in connection with U.S. Appl. No. 14/788,410, dated Apr. 5, 2018, 30 pages.

United States Patent and Trademark Office, "Non-final Office Action," issued in connection with U.S. Appl. No. 14/788,393, dated Oct. 10, 2017, 17 pages.

United States Patent and Trademark Office, "Final Office Action," issued in connection with U.S. Appl. No. 14/788,410, dated Nov. 16, 2017, 26 pages.

United States Patent and Trademark Office, "Final Office Action," issued in connection with U.S. Appl. No. 14/788,413, dated Nov. 17, 2017, 17 pages.

United States Patent and Trademark Office, "Non-Final Office Action," issued in connection with U.S. Appl. No. 14/788,410, dated Jun. 1, 2017, 17 pages.

United States Patent and Trademark Office, "Non-Final Office Action," issued in connection with U.S. Appl. No. 14/788,413, dated Jun. 5, 2017, 11 pages.

Mell et al., "The NIST Definition of Cloud Computing," NIST Special Publication 800-145, Sep. 2011, 7 pages, [http://nvlpubs.nist.gov/nistpubs/Legacy/SP/nistspecialpublication800-145.pdf].

Lheureux, "Cloud Services Brokerage," 2013, 2 pages, [retrieved from http://www.gartner.com/technology/research/cloud-computing/report/cloud-services-brokerage.jsp].

Forrester Research, "Social Business: Delivering Critical Business Value," A Custom Technology Adaptation Profile Commissioned by VMware, Apr. 2012, 7 pages.

Dancy, "Social IT, People as a Platform," May 2012, 8 pages, [retrieved from http://www.servicesphere.com/blog/2012/5/9/what-is-social-it.html].

Socialcast, "Socialcast Developer API," retrieved from Internet on Dec. 10, 2011, 136 pages, [retrieved from https://web.archive.org/web/20111210051856/http://socialcast.com/resources/api.html].

Apache Software Foundation, "OpenNLP," 2017, 2 pages, [retrieved from http://opennlp.apache.org/].

Princeton University, "About WordNet," Mar. 17, 2015, 3 pages, [retrieved from http://wordnet.princeton.edu/].

Porter, "The Porter Stemming Algorithm," Jan. 2006, 7 pages, [retrieved from http://tartarus.org/~martin/PorterStemmer/].

Jack of All Clouds, "Anatomy of an Amazon EC2 Re-source ID," Sep. 21, 2009, 8 pages, [retrieved from http://web.archive.org/web/20100314215931/http://www.jackofallclouds.com/2009/09/anatomy-of-an-amazon-ec2-resource-id/].

Rumburg, "Staffing the Desktop Support Function: How Many Technicians Do You Need?" 2012, 5 pages, [retrieved from http://www.servicemanagementfusion.com/conference/~/media/HDIConf/2012/Files/White%20Papers/Rumburg%20-%20Optimal%20Staffing%20Desktop%20Support.pdf].

Dancy "1862 vs. 2013—Form-based Workflow Should be Dead," 2013, 26 pages, [retrieved from https://plus.google.com/110210255323789498026/posts/ VPkAQsfUiPV].

Servicenow, "Social IT," Product Documentation, Oct. 3, 2012, 2 pages, [retrieved from https://wiki.servicenow.com/index.php?title=Social_IT].

IT Smartdesk Ltd., "Product Homepage," 2012, 3 pages, [retrieved from http://web.archive.org/web/20121003153512/http://www.itsmartdesk.com].

Zendesk, "Customer Service Software and Support Ticket System," Product Homepage, 2017, 4 pages, [retrieved from http://www.zendesk.com].

Wikipedia, "Office Assistant," 2013, 7 pages, [retrieved from http://en.wikipedia.org/wiki/Office_Assistant].

EMC Corporation, "EMC Ionix Service Manager Version 9.0—API User Guide," Mar. 2010, 30 pages.

Virtualization Impact, "VMware Socialcast Named IDC's Leader in the Social Enterprise Space," Nov. 6, 2012, 2 pages, [retrieved from http://virtualizationimpact.com/?p=2104].

Rhodes, "Avoiding the War Room," IBM Systems Magazine, Mainframe Edition, Nov. 2010, 3 pages, [retrieved from http://media.bmc.com/edu/BMCWhtppr_Sept_Reprint.pdf].

Salesforce, "Help Desk Software, Customer Service App for Small Businesses," Product Overview, retrieved from Internet on Jun. 19, 2017, 6 pages, [retrieved from http://salesforce.com/products/desk/overview].

Yahoo! Inc., "Yahoo! Answers Homepage," 2017, 2 pages, [retrieved from http://answers.yahoo.com/].

Yelp Inc., "Yelp Homepage," 2017, 4 pages, [retrieved from http://www.yelp.com].

VMware, Inc., "vCloud Automation Center API—6.2.1," VMware vRealize Automation 6.2 Information Center, 65 pages, Apr. 1, 2015, [retrieved from https://pubs.vmware.com/vra-62/index.jsp#com.vmware.vra.restapi.doc/index.html].

Michael Butt, "APM &DevOps: How to Collaborate Effectively with the Virtual War Room," Application Performance Monitoring Blog, Dec. 4, 2014, (5 pages). Retrieved from the Internet: <URL:https://blog.appdynamics.com/devops/get-better-at-devops-with-virtual-war-room/>.

BMC Software, "Cloud Lifecycle Management Managing Cloud Services from Request to Retirement," 2010 (8 pages).

Gottopati et al., "Finding Relevant Answers in Software Forums," Proceedings of the 26th IEEE/ACM International Conference on Automated Software Engineering (ASE 2011), Nov. 6-10, 2011, (11 pages). Retrieved from the Internet: <URL: http://ink.library.smu.edu.sg/cgi/viewcontent.cgi?article=2400&context=sis_research>.

(56) References Cited

OTHER PUBLICATIONS

United States Patent and Trademark Office, "Advisory Action," issued in connection with U.S. Appl. No. 14/788,410, dated Feb. 7, 2018, 2 pages. (Copy not provided as this is a USPTO document. Applicant will provide document upon request from Examiner.).

United States Patent and Trademark Office, "Final Office Action," issued in connection with U.S. Appl. No. 14/788,393, dated May 3, 2018, 20 pages. (Copy not provided as this is a USPTO document. Applicant will provide document upon request from Examiner.).

United States Patent and Trademark Office, "Corrected Notice of Allowability" issued in connection with U.S. Appl. No. 14/788,413, dated Aug. 10, 2018, 2 pages. (Copy not provided as this is a USPTO document. Applicant will provide document upon request from Examiner.).

United States Patent and Trademark Office, "Corrected Notice of Allowability" issued in connection with U.S. Appl. No. 14/788,413, dated Aug. 15, 2018, 2 pages. (Copy not provided as this is a USPTO document. Applicant will provide document upon request from Examiner.).

United States Patent and Trademark Office, "Notice of Allowance," issued in connection with U.S. Appl. No. 14/817,881, dated Sep. 19, 2018, 5 pages.

United States Patent and Trademark Office, "Notice of Allowance," issued in connection with U.S. Appl. No. 14/788,410, dated Oct. 24, 2018, 10 pages.

United States Patent and Trademark Office, "Non Final Office Action", dated Feb. 14, 2019, in connection with U.S. Appl. No. 14/788,393, 20 pages.

United States Patent and Trademark Office, "Final Office Action," dated Sep. 4, 2019 in connection with U.S. Appl. No. 14/788,393, 18 pages.

United States Patent and Trademark Office, "Non-Final Office Action," issued in connection with U.S. Appl. No. 14/788,393, dated Apr. 29, 2020, 19 pages.

United States Patent and Trademark Office, "Non-Final Office Action" issued in connection with U.S. Appl. No. 14/788,393, dated Aug. 19, 2020, (17 pages).

\* cited by examiner

VIRTUAL WAR ROOM 500

| USERS PARTY 400 | TECHNICIANS PARTY 405 | VENDOR PARTY 410 |
|---|---|---|
| User 1: I am unable to access files #Incident @Fileshare #PUBLIC | User 1: I am unable to access files #Incident @Fileshare #PUBLIC | User 1: I am unable to access files #Incident @Fileshare #PUBLIC |
| Technician 1: We will look into resolving @Fileshare #USERS | Technician 1: We will look into resolving @Fileshare #USERS | |
| Marvin: See url.war_rm/10132 for recent @Fileshare war rooms | Marvin: See url.war_rm/10132 for recent @Fileshare war rooms | Marvin: See url.war_rm/10132 for recent @Fileshare war rooms |
| | Technician 1: We need to re-boot our servers. | Vendor Technician 1: We should send them version 2. |
| | Technician 2: No we don't, I've found bugs. It will be fixed soon. | Vendor Technician 2: No, it is probably requires a simple bug fix. |
| | Technician 2: All bugs are fixed #OWNERS | Technician 2: All bugs are fixed #OWNERS |
| Technician 2: @Fileshare issues are resolved #PUBLIC | Technician 2: @Fileshare issues are resolved #PUBLIC | Technician 2: @Fileshare issues are resolved #PUBLIC |
| User 1: Thank you so much! #USERS | User 1: Thank you so much! #USERS | |

FIG. 5

METHODS AND APPARATUS TO GENERATE VIRTUAL WAR ROOMS VIA SOCIAL MEDIA IN ENTERPRISE NETWORK ENVIRONMENTS

FIELD OF THE DISCLOSURE

This disclosure relates generally to enterprise network environments, and, more particularly, to methods and apparatus to generate virtual war rooms via social media in enterprise network environments.

BACKGROUND

In recent years, enterprise network environments have evolved to better monitor the health or statuses of computer services and resources. Virtual war rooms have emerged as tools to consolidate the process of troubleshooting and resolving unexpected computing issues. Virtual war rooms enable efficient information sharing and computing issue mediation.

BRIEF DESCRIPTION OF THE DRAWINGS

FIG. 5 depicts an example chat session illustrating message visibility amongst peer conversation groups managed by a war room generator of FIG. 2 in an example virtual war room.

DETAILED DESCRIPTION

Figure 1:
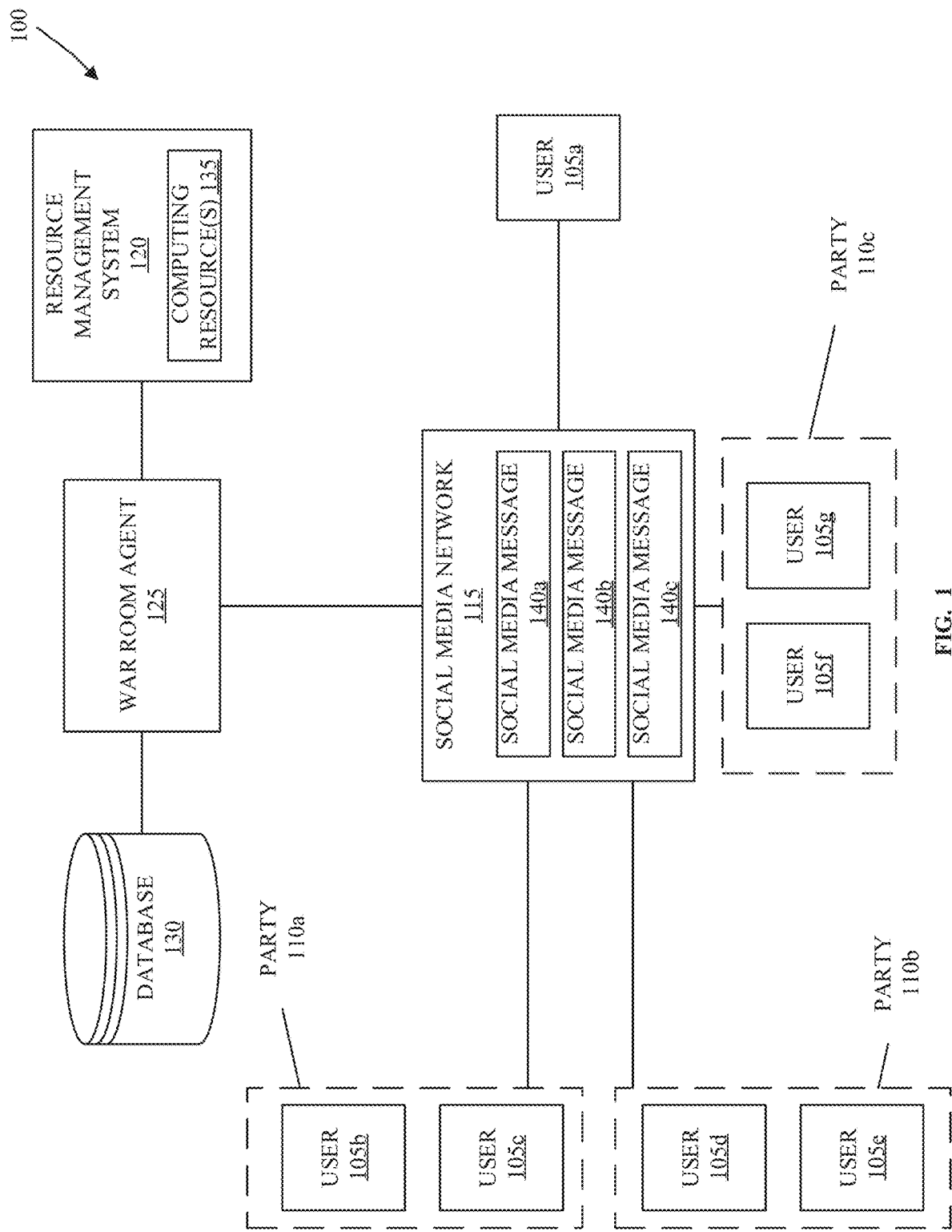
FIG. 1 is an example system that may be used to implement an enterprise network environment using social media services in accordance with the teachings of this disclosure.

War rooms are rooms where people meet and exchange plans, information, suggestions, and ideas in a dynamic way, oftentimes to overcome problems and issues. In military applications, war rooms may be a headquarters where military officials meet to discuss battle plans and strategize areas of attack. In business environments, war rooms may be spaces where customers, employees, managers, and others can co-operate to resolve issues in quick and efficient manners.

In information technology (IT), war rooms provide spaces for collaboration and allow programmers, technicians, etc. to deal with and to solve major incidents and issues that disrupt services provided by IT infrastructures. However, personnel required to resolve these major incidents and issues may not be situated in a same physical location. In these instances, multiple war rooms may be established in different locations and communicatively linked via modern technologies. Web sharing, teleconferences, etc. can supplement or augment collaboration efforts by communicatively linking multiple war rooms and enabling people to share information without being situated in the same physical location. However, these types of modern technologies applied to war rooms require all participating members to compromise on a specific meeting time to collaborate, possibly requiring members to coordinate in different time zones.

Virtual war rooms present information to participants in an online, computerized manner. While war rooms are physical rooms and/or areas where people congregate, virtual war rooms may be collaboration spaces, online message boards, communication clients, forums, or instant message (IM) chat sessions that allow participants, who may be situated in different locations and time zones, to share information. Additionally, virtual war rooms do not require the physical presence of a war room member in a physical space or area. Virtual war rooms enable participants to choose when they share information. In some examples, virtual war rooms include conversation threads that identify steps taken to resolve computing resource issues. However, creating a virtual war room requires a person to first identify an issue(s), decide if the issue(s) calls for creation of the virtual war room, identify personnel with expertise about the issue(s) at hand, and subsequently invite the personnel to join the virtual war room. In this manner, creating a virtual war room is a manual process.

In enterprise network environments, computing resource issues are identified by enterprise network environment officials (e.g., administrators, cloud operators, IT technicians, etc.) subsequent to users experiencing and reporting problems concerning services, applications, etc. By the time computing resource issues are identified and diagnosed, the computing issues may have extended to a large number of users, potentially inhibiting business-critical operations in enterprise network environments. Identifying computing issues and initiating problem solving processes before enterprise network users experience the computing issues, is integral in preserving business-critical operations.

Examples disclosed herein enable generation of virtual war rooms via social media in enterprise network environments. In examples disclosed herein, an agent (e.g., an autonomous process, machine, or circuit) receives a status associated with a computing resource from a resource management system of an enterprise network environment. In some examples, the status received by the agent includes performance metrics and/or health metrics monitored and configured by the resource management system. The agent determines whether the status satisfies a threshold. The threshold may define a minimum acceptable status specified in a status agreement such as, for example, a service level agreement (SLA) (e.g., an agreement between a computing resource provider and a customer defining computing resources that the computing resource provider will furnish, the minimum concurrent users that can be provided computing resources, minimum acceptable application response time, minimum acceptable bandwidth, minimum acceptable latency, etc.). In some examples, the agent compares the received status against the threshold to determine whether the status satisfies the threshold. The comparison to a threshold is used to identify errors or issues in the network.

In examples disclosed herein, when the status satisfies the threshold, the agent generates a virtual war room associated with the computing resource. The agent selects parties that are members of the enterprise network environment based on the status agreement. In some examples, the agent accesses and analyzes SLAs to identify parties associated with the computing resource (e.g., parties responsible for maintaining and troubleshooting the computing resource, parties that have the computing resource operating in their computing infrastructure, parties that designed and/or created the computing resource, etc.). In some examples, the agent may also access and analyze SLAs to identify individual members of parties associated with the computing resource.

In some examples, the virtual war room is a communication client, a message board, a forum, an instant message (IM) chat session, etc. The agent invites, via a social media network and/or social media interface, selected parties associated with the computing resource to access the virtual war room. In some examples, the selected parties are associated with the same or different social media network and/or social media interface.

Examples disclosed herein manage the delivery of messages in an enterprise network environment. Examples disclosed herein manage the delivery of messages in a virtual war room, a communication client, a message board, and/or an instant message (IM) exchange. In examples disclosed herein, the agent receives a message from a user of an enterprise network environment via a social media network. The agent identifies an occupational position of the user such as, for example, a job title, a company ranking, an employment status, etc. The agent subsequently scans the message for identifiers. In some examples, the identifiers may include symbols, identifiers, characters, numbers, and/ or any other suitable means for identification.

Examples disclosed herein enable determining, with the agent and using a computer-executable process, whether the message includes identifiers. When the message does not include an identifier(s), the agent delivers the message to a first plurality of users of an enterprise entity via the social media network. In examples disclosed herein, the first plurality of users are characterized by the same occupational position as the user who submitted the message. In some examples, the enterprise entity may be a party of the enterprise network environment. When the message includes at least one identifier(s), the agent identifies a different enterprise entity. The different enterprise entity may be associated with the at least one identifier(s) and includes a second plurality of users characterized by a different occupational position as the user who submitted the message. In some examples, when the message includes a certain type(s) of identifier(s), the agent stores the message in a database. In examples disclosed herein, when the message includes at least one identifier(s), the agent delivers the message to at least one of the second plurality of users via the social media network. In some examples, the agent delivers the message to a party when the message includes at least one identifier(s)

Examples disclosed herein may be implemented in connection with cloud computing environments using virtual machines and/or containers. A virtual machine is a data computer node that operates with its own guest operating system on a host using resources of the host virtualized by virtualization software. A container is a data computer node that runs on top of a host operating system without the need for a hypervisor or separate operating system.

FIG. 1 depicts an example enterprise network environment 100 that enables generation of virtual war rooms and enables users to converse and exchange messages about computing resources via social media interfaces. The example enterprise network environment 100 includes example users 105 *a-g*, example parties 110*a-c*, an example social media network 115, an example resource management system 120, an example war room agent 125, and an example database 130.

In the illustrated example, users 105*a-g* are people who can access and interact with the enterprise network environment 100. In some examples, the users 105*a-g* may access computing resources 135 of the resource management system 120. For example, users 105*a-g* may be customers, technicians, and/or developers associated with the enterprise network environment 100. In some examples, the users 105*a-g* may be employees of an enterprise network and/or service provider. In other examples, the users 105*a-g* may be people employed by customers of the enterprise network and/or service provider. In examples disclosed herein, the enterprise network environment 100 is not restricted to the users 105*a-g* illustrated in FIG. 1 and any number of enterprise network users may exist.

In the illustrated example, parties 110*a-c* are groupings of individual users 105*a-g*. In some examples, parties 110*a-c* may be departments and/or branches of businesses, companies, and/or organizations. In other examples, parties 110*a-c* may include assemblages of users 105*a-g* that share similar job titles, job responsibilities, and/or have permissions to access similar computing resources 135 of the enterprise network environment 100. In other examples, parties 110*a-c* may be departments and/or branches of the same and/or different businesses, companies and/or organizations that use the enterprise network environment 100. In examples disclosed herein, the enterprise network environment 100 is not restricted to parties 110*a-c* illustrated in FIG. 1 and any number and/or type(s) of enterprise network parties may exist.

In examples disclosed herein, the parties 110*a-c* may include ones of the users 105*a-g*. In some examples, at least one of the users 105*a-g* may serve and/or be members of at least ones of the parties 110*a-c*. In the illustrated example, users 105*b-c* may belong to example party 110*a*, users 105*d-e* may belong to example party 110*b*, and users 110*f-g* may belong to example party 110*c*. For example, an electric utility company that is a member, customer, etc. of an enterprise network provider, providing the enterprise network environment 100, may support business operations by utilizing and/or accessing computing resources 135 of the enterprise network environment 100. The example party 110*a* may represent a power generation department and the example party 110*b* may represent an IT department within the electric utility company. In some examples, ones of the parties 110*a-c* may have access to different resources than others ones of the parties 110*a-c*. For example, the IT department may have access to computing infrastructure provided by the example enterprise network environment 100 to manage, monitor and oversee computing resources 135 deployed to other departments within the electric utility company (e.g., the power generation department). In some examples, the IT department may have authority to distribute computing infrastructure to other departments within the electric utility company such as, for example, the power generation department. In some examples, the example party 110*a* may be a "Users" party and the example party 110*b* may be a "Technicians" party of the same business, company, and/or organization. The "Users" party may be a department affected by an issue associated with a computing resource 135 and the "Technicians" party may be a department dedicated to resolving certain complexities of the issue. In other examples, the example party 110*c* may be a "Vendor" party of a different business, company, and/or organization. The "Vendor" party may be a provider(s) of the computing resource 135 experiencing the issue. Alternatively, ones of the users 105a-g may not serve and/or be members of any of the parties 110a-c such as, for example, user 105a of FIG. 1. In some examples, user 105a may be an accredited figure (e.g., an enterprise network administrator, a chief executive officer (CEO), a supervisor, etc.) that does not belong to any ones of the parties 110a-c. Additionally, any ones of the users 105a-g may belong to any ones of the parties 110a-c. In some example, any ones of the users 105a-g may or may not belong to the "Users" party, the "Technicians" party, and/or the "Vendor" party previously described.

To facilitate conversation and message(s) exchange between users 105a-g, the example enterprise network environment 100 is provided with an example social media network 115. The example social media network 115 may be any platform that facilitates building and managing social relations among people. The example social media network 115 of FIG. 1 may be implemented using any one or more suitable type(s) of social media network platforms (e.g., VMware Socialcast, etc.). The example social media network 115 provides a social media interface(s) or a different type(s) of social media interface(s) that enables and supports message exchange.

In some examples, the social media network 115 is separate from the enterprise network environment 100. In some examples, the social media network 115 is, or is not, a social media platform designed and developed by an enterprise network provider. For example, the social media network 115 may be VMware Socialcast and the enterprise network provider providing the enterprise network environment 100 may be VMware, Inc. In other examples, the social media network 115 may be Facebook, Twitter, etc. whereas the enterprise network provider providing components of the enterprise network environment 100 may be VMware, Inc. In some examples, if the social media network 115 is not a social media platform designed and developed by the enterprise network provider, the social media network 115 may be compatible with and/or interfaced to the enterprise network environment 100.

In the illustrated example of FIG. 1, users 105a-g may post a message(s) via the social media network 115. For example, a user 105a-g may post the message(s) via the social media network 115 to converse with different ones of the users 105a-g. In examples disclosed herein, the user 105a-g may post the message(s) via the social media network 115 to request a computing resource status update (e.g., the current health condition of a computing resource) from the enterprise network environment 100. The example social media network 115 also enables users 105a-g to receive the message(s) and/or instant message(s) from other ones of the users 105a-g.

Additionally, any ones of the users 105a-g may post a message(s) via the social media network 115 that can be viewed by members of ones of the parties 110a-c. For example, user 105a may post a message(s) that can be viewed by ones of the users 105a-g that belong to ones of the parties 110a-c. In some examples, users 105a-g may post a message(s) to message threads (e.g., a series of messages posted in reply to previous messages, synchronous or asynchronous online chat environments, etc.) via the social media network 115. The example social media network 115 also enables ones of the users 105a-g and/or parties 110a-c to view and/or to access the messages(s) posted by other ones of the users 105a-g. Moreover, the example social media network 115 enables users 105a-g and/or parties 110a-c of a business, company, and/or organization to post a message(s) to other users 105a-g and/or parties 110a-c of different businesses, companies, and/or organizations. For example, if example party 110a is a power generation department and example party 110b is an IT department of an electric utility company, the social media network 115 enables the users 105a-g of these departments to post messages and enables users 105a-g of a software development department (e.g., party 110c), of a software provider company, to view and/or to access the message(s), and/or vice-versa.

Messages posted to the example social media network 115 are disclosed herein as example social media messages 140a-c. In the illustrated example, the social media messages 140a-c may include requests, provide steps taken toward resolving computer resource issues, suggest solutions to computing resource issues, etc. Social media messages 140a-c may be posted to the social media network 115 in any suitable format including via a message board post, via an instant message, via an email, via a short messaging service (SMS) text message, etc.

In some examples, ones of the users 105a-g may review social media messages 140a-c, or message threads, posted to the social media network 115 by different ones of the users 105a-g and subsequently post social media messages 140a-c to suggest solutions to a computing resource issue(s). For example, if a user 105a-g posts a social media message(s) 140a-c via the example social media network 115 to reveal developments in a resolution of a problem, the social media network 115 sends, forwards, or provides (e.g., unicast, multicast, broadcast, etc.) the social media message(s) 140a-c to the same and/or different party 110a-c and/or different ones of the users 105a-g. In such examples, ones of the users 105a-g may respond to the social media message(s) 140a-c with a different social media message(s) 140a-c, providing additional developments, opinions, and/or suggestions related to the problem.

In examples disclosed herein, social media messages 140a-c may include a tag(s). A tag, as disclosed herein, refers to symbols, identifiers, characters, numbers, and/or any other suitable means for identification included in the social media message 140a-c that may be used to direct delivery of the social media messages 140a-c to ones of the users 105a-g and/or party 110a-c of the enterprise network environment 100. The tag, as disclosed herein, may also refer to symbols, identifiers, characters, numbers, and/or any other suitable means for identification included in the social media message 140a-c that may be used to initiate storage operations such as, for example, logging IT tickets, and to refer to a computing resource(s) 135. Examples disclosed herein enable users 105a-g to include the tag(s) in, or append a tag(s) to, social media messages 140a-c to direct the delivery of the social media messages 140a-c to specific users 105a-g and/or parties 110a-c.

In some examples, a user 105a may include a tag(s) in, or append the tag(s) to, a social media message 140a-c to direct the social media message 140a-c to example party 110a. In the illustrated example, the user 105a may include a tag(s) in, or append the tag(s) to, a social media message 140a-c to communicate information to a specific party 110a-c and/or hide or conceal information from a different party 110a-c. In some examples, social media messages 140a-c may include confidential information that the user 105a-g posting the social media message 140a-c may determine to be inappropriate or unsuitable if presented to other ones of the users 105a-g and/or parties 110a-c. For example, the user 105a may include a tag, "# PartyA," in a social media message 140*a-c* to direct the social media message 140*a-c* to party 110*a*. In some examples, the user 105*a* may include or append tag, "# PartyA," to prevent party 110*b* and/or party 110*c* from receiving and/or viewing the social media message 140*a-c* via the social media network 115. In other examples, the user 105*a-g* may direct social media messages 140*a-c* to the war room agent 105 with or without including tag(s).

The example resource management system 120 of the enterprise network environment 100 manages and monitors computing resources 135. The example resource management system 120 also collects and measures computing resources 135 to derive statistical models of performance. In some examples, the resource management system 120 may obtain data from any type of computing resource 135 such as, for example, data centers, clusters, data stores, hosts, virtual machines, containers, storage arrays, network devices, hypervisors, etc. In some examples, the resource management system 110 may be implemented using a vRealize Automation system, a vRealize Operations Manager system, and/or a vCenter Operations Manager system developed and sold by VMware, Inc.

In other examples, any other suitable resource management platform may be used to implement the resource management system 120. The example resource management system 120 of the illustrated example may monitor computing resources 135 and monitor and/or generate statuses such as performance and/or health metrics corresponding to the computing resource(s) 135 (e.g., bandwidth, throughput, latency, error rate, etc.). The example resource management system 120 of the illustrated example may also include a computing resource catalog by which computing resources 135 can be provisioned from. In some examples, the resource management system 120 automates and manages IT services such as, for example, storing and tracking ticket information related to computing resource issues (e.g., information characteristic of computing resource issues such as urgency assessment of the issue, date, detailed description, attempted solutions, etc.).

In some examples, the resource management system 120 automatically manages and monitors computing resources 135 deployed to users 105*a-g*. In some examples, the resource management system 120 allocates and provisions computing resources to the users 105*a-g* upon request via a user-submitted social media message 140*a-c*. Additionally, the resource management system 120 monitors computing resources deployed to parties 110*a-c*. In some examples, the performance and/or health metrics generated by the resource management system 120 are accessed and/or received by the example war room agent 125.

The war room agent 125 of the illustrated example is an autonomous process, machine, and/or circuit that performs operations based on computer-executable instructions and/or logic circuits. The example war room agent 125 is a processing unit that executes instructions or otherwise performs operations to automatically generate virtual war rooms, access and/or receive a status(es) and/or a status agreement(s) from the resource management system 120, deliver computing resource statuses to users 105*a-g*, facilitate social media message 140*a-c* delivery from ones of the users 105*a-g* to different ones of the users 105*a-g* and/or parties 110*a-c*, log ticket information, determine generating virtual war rooms is necessary when the status(es) satisfies a threshold(s), and access and provide archived virtual war rooms.

The example war room agent 125 reads social media messages 140*a-c* posted by users 105*a-g* via the example social media network 115. The example war room agent 125 processes social media messages 140*a-c* posted to message boards and/or IM chat sessions and, in some examples, subsequently replies by posting automated, social media messages 140*a-c* to the message boards and/or IM chat sessions via the social media network 115. In examples disclosed herein, the war room agent 105 scans social media messages 140*a-c* and identifies a tag(s) to facilitate delivery of social media messages 140*a-c* between users 105*a-g* and/or parties 110*a-c*. In examples disclosed herein the war room agent 125 may interpret the tag(s) and facilitate the delivery of social media messages 140*a-c* to parties 110*a-c* and or ones of the users 105*a-g*.

In examples disclosed herein, the resource management system 120 delivers performance and/or health metrics to the war room agent 125. Alternatively, in examples disclosed herein, the war room agent 125 accesses, and/or receives, performance and/or health metrics from the resource management system 120. Examples disclosed herein enable the war room agent 125 to determine whether performance and/or health metrics satisfy a threshold such as, for example, a bandwidth threshold. Alternatively, in some examples, the example war room agent 125 may access a status agreement such as, for example, a SLA, to identify computing resource thresholds contractually established between an enterprise network provider and customers such as, for example, the users 105*a-g*. If the example war room agent 125 determines that the threshold is satisfied, the war room agent 125 automatically generates a virtual war room(s). Alternatively, in some examples, the war room agent 105 may detect an alert generated by the resource management system 120 such as, for example, a simple network management protocol (SNMP) trap, that indicates a threshold is satisfied and subsequently generate a virtual war room(s). When the virtual war room(s) is generated, the war room agent 125 may access and/or receive the status agreement to identify and select users 105*a-g* and/or parties 110*a-c* associated with a computing resource 135. For example, the war room agent 125 may identify, select, and invite users 105*f-g* of party 110*c* to access the generated virtual war room. The users 105*f-g* may be technicians responsible for troubleshooting a computing resource issue, as defined in the status agreement. In some examples, the war room agent 125 may invite all users 105*a-g* affected by the computing resource issue to access the virtual war room. The users 105*a-g* invited to access the virtual war room may subsequently participate in message exchanges with different ones of the users 105*a-g*.

In examples disclosed herein the war room agent 125 may generate a virtual war room(s) upon request from users 105*a-g*. In some examples, the users 105*a-g* may request that the war room agent 125 generate a virtual war room via a social media message 140*a-c*. In some examples, the social media message 140*a-c* may include a tag(s) that directs the war room agent 125 to generate a virtual war room. For example, example user 105*a* may submit a social media message 140*a-c* including tags, "# WarRoomCall@VMwarePlayer," to request that the war room agent 125 generate a virtual war room associated with a malfunctioning VMware Player application. In examples disclosed herein, the war room agent 125 may interpret the social media message 140*a-c*, and corresponding tags, posted by user 105*a* and generate a virtual war room dedicated to resolving a computing issue associated with a VMware Player application. Additionally, users 105*a-g* may invite other ones of the users 105*a-g* or parties 110*a-c* to access the virtual war room by posting social media messages 140a-c to the war room agent 105 requesting their involvement.

In examples disclosed herein, the war room agent 125 logs ticket information automatically and upon request from an example user 105a-g. The war room agent 125 accesses and/or receives statuses such as performance and health metrics from the resource management system 120 and, when the war room agent 125 determines a corresponding threshold(s) has been satisfied, logs ticket information associated with a computing resource 135. For example, when the threshold(s) is satisfied, the war room agent 125 may log performance metrics, health metrics, and/or assessments of the computing resource issue as ticket information in the resource management system 120 and/or the example database 130 of FIG. 1.

Alternatively, if a user 105a-g discovers or identifies a computing resource issue that the war room agent 125 has not recognized, the user 105a-g may request the war room agent 125 log the ticket information in the resource management system 120 and/or the database 130. In some examples, the user 105a-g sends a social media message 140a-c requesting the computing resource issue be logged. For example, a user 105a-g may post a social media message 140a-c that includes a detailed description of a computing resource issue, attempted solutions at resolving the computing resource issue, and/or any other ticket information. The user 105a-g may submit the social media message 140a-c with a tag(s) to direct the war room agent 125 to log the social media message 140a-c as ticket information in the resource management system 120 and/or database 130. For example, the user 105a-g may submit a social media message 140a-c including tags, "# Incident@VMwarePlayer," to request that the war room agent 125 log the social media message 140a-c as ticket information. In examples disclosed herein, the war room agent 125 may interpret the social media message 140a-c, and corresponding tags, posted by the user 105a-g and log the social media message 140a-c as ticket information. In some examples, the war room agent 125 interprets the tag "# Incident" and automatically logs the social media message 140a-c as ticket information, corresponding to a VMware Player application (e.g., determined by the war room agent 125 interpreting the tag "@VMPlayer"), in the resource management system 120 and/or the database 130.

Examples disclosed herein enable the war room agent 125 to access and retrieve archived virtual war rooms. Archived virtual war rooms are historical virtual war rooms that have been saved as references for future computing issues. Archived virtual war rooms may include saved message threads, saved instant message exchanges, and information that assists users 105a-g in resolving future computing resource issues. Examples disclosed herein also enable the war room agent 125 to provide archived virtual war rooms to users 105a-g and/or parties 110a-c. When a virtual war room is generated, the war room agent 125 may access and/or retrieve archived virtual war rooms corresponding to the computing resource issue at hand from the example database 130. In other examples, the war room agent 125 may post links, URLs, etc. to the virtual war room enabling users 105a-g and/or parties 110a-c to access the archived virtual war rooms. For example, if the war room agent 125 generates a virtual war room subsequent to determining latency associated with a virtual machine satisfies a threshold, the war room agent 125 may access the example database 130 to identify and retrieve archived virtual war rooms related to latency and/or the virtual machine.

The example database 130 in the illustrated example of FIG. 1 may store archived virtual war rooms, thresholds, and ticket information. The database 130 may be accessed by the example war room agent 125.

Figure 2:
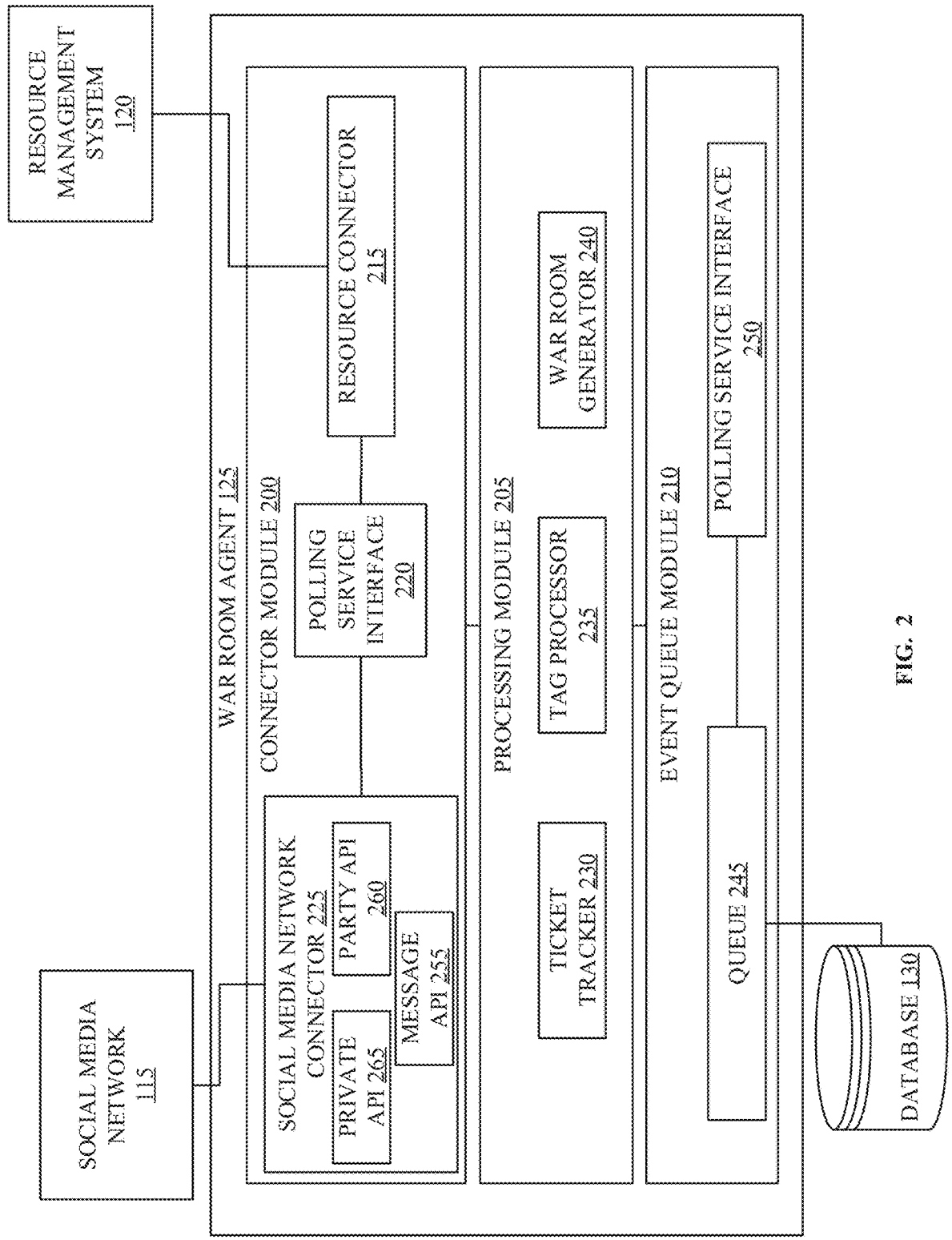
FIG. 2 is an illustration showing additional detail of the example war room agent of FIG. 1.

FIG. 2 depicts an example processing architecture of the example war room agent 125 of the example enterprise network environment 100 of FIG. 1. The example war room agent 125 interacts with the example resource management agent 120 and the example social media network 115 and performs actions. In some examples, the war room agent 125 performs actions based on user-submitted social media messages 140a-c. In the illustrated example, the example war room agent 125 includes an example connector module 200, an example processing module 205, and an example event queue module 210.

The example connector module 200 interfaces with the resource management system 120 and the example social media network 115. The example connector module 200 is provided to access raw data (e.g., text) in social media messages 140a-c and to communicate with components of the example enterprise network environment 100. For example, the connector module 200 can access data in social media messages 140a-c and/or send social media messages 140a-c to the social media network 115. The example connector module 200 includes an example resource connector 215, an example polling service interface 220, and an example social media network connector 225.

The example processing module 205 performs actions based on statuses accessed and/or received from the resource management system 120 and social media messages 140a-c accessed and/or received from the social media network 115. The example processing module 205 includes an example ticket tracker 230, an example tag processor 235, and an example war room generator 240.

The example event queue module 210 enables efficient processing of data requests and network traffic without significant decreases in performance. The example event queue module 210 organizes data processing requests into incoming and outgoing requests. The example event queue module 210 includes an example queue 245 and an example polling service interface 250.

Turning to the example connector module 200 of FIG. 2, the example resource connector 215 temporarily stores data and facilitates communications between the example resource management system 120 and the example processing module 205. In the illustrated example, the example resource connector 215 polls the resource management system 120 from time to time, utilizing the example polling service interface 220.

The example polling service interface 220 may poll the example resource management system 120 and the example social media network 115 to continuously check for computing resources 135, statuses, social media messages 140a-c and/or other information. In some examples, the polling service interface 220 may continuously check for computing resources 135, statuses, social media messages 140a-c and/or other information requested via user-submitted social media messages 140a-c.

The example social media network connector 225 temporarily stores and facilitates communications between the example social media network 115 and the example processing module 205. In the illustrated example, the social media network connector 225 polls the social media network 115 from time to time, utilizing the example polling service interface 220. The example social media network connector 225 includes example message application programmable interface (API) 255, example party API 260, and example private API 265. Any of the example message API 255, the example party API 260, and/or the example private API 265 may enable the war room agent 125 to communicate with the social media network 115 and provide compatibility between different types of social media networks 115 running on a same or different operating system(s). In the illustrated example, any of the example message API 255, the example party API 260, and/or the example private API 265 may be a representational state transfer (REST) API that communicates using the Hypertext Transfer Protocol (HTTP) to retrieve and send data between the war room agent 125 and the social media network 115.

The example message API 255 allows the war room agent 125 to access social media messages 140a-c posted via the social media network 115. The example message API 255 enables the war room agent 125 to deliver messages posted by users 105a-g to other ones of the users 105a-g and/or parties 110a-c. In some examples, the message API 255 scans social media messages 140a-c for a tag(s). Additionally, the message API 255 enables the war room agent 125 to respond to social media messages 140a-c posted by ones of the users 105a-g to the social media network 115. For example, the war room agent 125 may interpret and analyze a social media message 140a-c posted by a user 140a-c and respond to the user 105a-g with a social media message 140a-c using the message API 255. In some examples, the message API 255 accesses and analyzes social media messages 140a-c and determines how the war room agent 125 will respond to the social media messages 140a-c.

The example party API 260 allows the war room agent 125 to add and/or remove parties 110a-c from a virtual war room. For example, the party API 260 may identify and assist in inviting departments and/or branches of a business, company and/or organization that currently do not have access to the virtual war room, to access the virtual war room. In some examples, the party API 260 may determine whether parties 110a-c should be added or removed from the virtual war room to support more efficient problem resolution. Additionally, the example party API 260 may facilitate sending invitations to the parties 110a-c to join (e.g., have permission to access) the virtual war room. Alternatively, the party API 260 may facilitate sending invitations to the users 105a-g to join the virtual war room.

The example private API 265 enables the war room agent 125 to deliver social media messages 140a-c to ones of the users 105a-g in a private manner. The example private API 265 further enables the war room agent 125 to converse with ones of the users 105a-g via social media messages 140a-c and prevent other ones of the users 105a-g and/or parties 110a-c from receiving the social media messages 140a-c. For example, the private API 265 may facilitate delivering confidential messages to an example user 105a, who may be an accredited figure (e.g., an enterprise network administrator, a chief executive officer (CEO), a supervisor, etc.) that does not belong to any ones of parties 110a-c. The private API 265 may enable the war room agent 125 to converse with the user 105a, and safeguard the confidentiality of the conversation by preventing other ones of the users 105a-g from accessing the conversation. Moreover, the private API 265 may enable a user 105a-g, such as an accredited figure, to approve business decisions by communicating with the war room agent 125 directly, without allowing other ones of the users 105a-g from viewing and/or accessing the social media messages 140a-c.

Turning to the example processing module 205 of FIG. 2, the example ticket tracker 230 automatically logs and stores ticket information in the example database 130, illustrated in FIG. 2, and/or resource management system 120 by analyzing and/or extracting information from social media messages 140a-c and/or from statuses accessed and/or received from the resource management system 120. For example, the example ticket tracker 230 may automatically log ticket information in the database 130 based on a tag(s) included in, or appended to, a social media message 140a-c. The example ticket tracker 230 substantially reduces or eliminates the need for users 105a-g to fill in a significantly large number of data fields, open multiple applications, and use multiple user interfaces and log-ins to submit ticket information. That is, the example ticket tracker 230 may guide users 105a-g through numerous steps to fill out virtual forms by querying the users 105a-g one question at a time for additional information related to a problem (e.g., a computing issue). In some examples, the ticket tracker 230 monitors ticket statuses and communicates ticket processing progress to an example user 105a-g, which substantially reduces the need for users to constantly request ticket status updates.

The example tag processor 235 scans and identifies tags included in, or appended to, social media messages 140a-c submitted by users 105a-g. Additionally, the example tag processor 235 determines the meaning and/or actions associated with an example tag. In examples disclosed herein, the tag processor 235 recognizes tag, "#," followed by a party 110a-c and/or a user 105a-g, as a command to direct the message API 255 to deliver a social media message 140a-c to parties 110a-c and/or users 105a-g specified by the tag. For example, the tag processor 235 may recognize tag, "# USERS," as a command to deliver social media messages 140a-c to a department(s) experiencing a computing issue and/or a department(s) responsible for resolving computing issues. In examples disclosed herein, the example tag processor 235 identifies the party 110a-c corresponding to a user 105a-g that submits a social media message 140a-c. In some examples, the example tag processor 235 identifies an occupational position (e.g., a job title, a company ranking, an employment status, etc.) corresponding to the user 105a-g that submits a social media message 140a-c.

In examples disclosed herein, the tag processor 235 recognizes tag, "@," followed by a computing resource 135, as an identifier that refers to an affected computing resource 135. For example, the tag processor 235 recognizes tag, "@VMwarePlayer," as an identifier to refer to an affected VMware Player application. The tag processor 235 may recognize the tag, "@," in a social media message 140a-c and subsequently access the status of the associated computing resource 135 in the resource management system 120. In examples disclosed herein, the tag processor 235 recognizes tag, "# Incident," as a command to log ticket information in the example database 130 and/or resource management system 120. In examples disclosed herein, the tag processor 235 recognizes tag, "# WarRoomCall," as a command to generate a virtual war room. For example, the tag processor 235 may recognize tag, "# WarRoomCall," and subsequently generate a virtual war room. Examples disclosed herein are not restricted to tags "#," "@," "# Incident,", and/or "# WarRoomCall" to deliver social media messages 140a-c to ones of the parties 110a-c and/or users 105a-g, to refer to affected computing resources 135, to log ticket information, and/or to generate virtual war rooms and any other type(s) of tag(s) may be used to facilitate action taken by the example war room agent 125.

In some examples, the tag processor 235 may scan social media messages 140a-c submitted by ones of the users 105a-g via the social media network 115 for a tag(s) and track the recurrence of a certain type(s) of tag(s) in the social media messages 140*a-c*. For example, the tag processor 235 may identify that ones of the users 105*a-g* have submitted ten social media messages 140*a-c* including the tag, "@VMwarePlayer," in a ten minute interval. In some examples, the tag processor 235 uses stemming (e.g., reducing words to their word stem, base or root form), chunking (e.g., identifying noun groups, verbs, verb groups, etc.), synonym comparison methods, and/or any other natural language processing method to analyze social media messages 140*a-c*. The tag processor 235 may be provided with spelling correction tools or IT-specific data sets for named entity recognition to improve functionality. In some examples, the tag processor 235 may analyze social media messages 140*a-c* submitted by ones of the users 105*a-g* and recognize the recurrence of a certain topic(s) in the social media messages 140*a-c* via natural language processing. In examples disclosed herein, the topic(s) refers to a computing resource(s) 135 and/or a computing resource issue that is a subject of conversation or discussion in the social media messages 140*a-c*. For example, the tag processor 235 may analyze social media messages 140*a-c* submitted by users 105*a-g* via the social media network 115 in a five minute period and, via natural language processing, recognize that eleven social media messages 140*a-c* submitted in the course of the five minute period included topics related to troubleshooting a network hypervisor.

The example war room generator 240 automatically generates virtual war rooms and selects parties 110*a-c* and/or users 105*a-g* to access the virtual war rooms. Additionally, the war room generator 240 accesses and/or receives a status agreement(s) and/or a status(es) from the resource management system 120 via resource connector 215 and determines whether the status(es) satisfies a threshold(s). In some examples, the war room generator 240 may determine the threshold(s) by analyzing the status agreement(s) such as, for example, SLAs accessed and/or received from the resource management system 120. The example war room generator 240 determines whether the status(es) accessed and/or received from the resource management system 120 satisfies the threshold(s) and, when the status(es) satisfies the threshold(s), the war room generator 240 generates virtual war rooms. The example war room generator 240 may also facilitate delivering invitations to parties 110*a-c* and/or users 105*a-g* selected to access the virtual war room via the example party API 260. In examples disclosed herein, the war room generator may also access archived virtual war rooms from the resource management system 120 and/or the example database 130 and post links, URLs, etc. to the generated virtual war room to enable users 105*a-g* and/or parties 110*a-c* to access the archived virtual war rooms.

In examples disclosed herein, the example war room generator 240 may access and/or receive information indicative of a recurrence(s) of topics and/or tags in social media messages 140*a-c* from the example tag processor 235. The information indicative of a recurrence(s) of topics and/or tags may include a value(s) (e.g., a quantity) of topics and/or tags included and/or discussed in social media messages 140*a-c* over a time period. In some examples, the war room generator 240 determines whether the information indicative of a recurrence(s) of topics and/or tags satisfies a threshold (s) such as, for example, a topic recurrence threshold and/or a tag recurrence threshold. The topic recurrence threshold may define a minimum or maximum quantity of social media messages 140*a-c* including a similar topic(s) submitted via the social media network 115 during a period. For example, the topic recurrence threshold may define a maximum of twelve social media messages 140*a-c* discussing network hypervisors be submitted via the social media network 115 in any four minute period. The tag recurrence threshold may define a minimum or maximum quantity of a certain type(s) of tag(s) included in any quantity of social media messages 140*a-c* submitted via the social media network 115 during a period. For example, the tag recurrence threshold may define that a minimum of six "@VMwarePlayer" tags included in any number of social media messages 140*a-c* be submitted via the social media network 115 in any two minute period. In examples disclosed herein, topic recurrence thresholds and tag recurrence thresholds are stored in example database 130.

When the war room generator 240 determines whether the information indicative of a recurrence(s) of topics and/or tags accessed and/or received from the tag processor 235 satisfies a topic recurrence threshold and/or a tag recurrence threshold, the war room generator 240 may compare the information indicative of the recurrence(s) of topics and/or tags to the content recurrence threshold and/or the tag recurrence threshold. When the information indicative of the recurrence(s) of topics and/or tags satisfies the topic recurrence threshold and/or the tag recurrence threshold, the war room generator 240 may generate a virtual war room corresponding to the topics and/or tags at hand.

Turning to the event queue module 210 of FIG. 2, the example queue 245 includes lists of data, commands, tags, archived virtual war rooms, social media messages 140*a-c*, etc. received from the example database 130 and/or the example processing module 205. The lists of data, commands, tags, archived virtual war rooms, social media messages 140*a-c*, etc. are temporarily stored in the example queue 245 before and after the processing module 205 processes the data, commands, etc. The lists of data, commands, etc. are to be retrievable in a defined or undefined order and implemented, for example, as a circular buffer, first-in-first-out buffer (e.g., FIFO), etc. In some examples, the event queue module 210 organizes data processing requests into incoming and outgoing requests to facilitate multiple computing resources 135 such as, for example, virtual machines, to process the example queue 245. In this manner, by using numerous computing resources 135 (e.g., virtual machines, containers, etc.) to process the queue 245 at the same time, network traffic can be substantially decreased, thus making more network bandwidth available for other communications, and preventing services, applications, programs, etc. from acquiring computing resources 135 at the expense of other services, applications, programs, etc. Social media message exchanges are configured to increase network traffic at any point in time. As such, using the event queue module to separate incoming network traffic from outgoing network traffic facilitates scalability in an application by supporting simultaneous allocation of computing resources 135 and preventing certain computing infrastructure(s) from allocating computing resources 135 at the expense of other computing infrastructure(s).

Use of social media often results in the generation of many messages in a short period of time. To manage high volumes of social media messages 140*a-c*, the example queue 245 facilitates quickly processing the messages during high-volume message periods. The example queue 245 may be implemented using a non-volatile memory to facilitate storing unprocessed data in the event of a system failure. In this manner, such unprocessed data does not have to be re-accessed from the example database 130.

In some examples disclosed herein, the example queue 245 facilitates access to different messages and performs simple maintenance, testing, debugging, and scaling out operations to support more users 105*a-g* and parties 110*a-c*. In some examples, the queue 245 works complementary with the example database 130 and serves to handle high-volume asynchronous processing. Example open standard protocols for message queues, which may be used to facilitate operation of the example queue 245 include the advanced message queueing protocol (AMPQ) and the streaming text oriented messaging protocol (STOMP). In some examples, the different types of protocols are concurrently use to store messages or information in different ways in the example queue 245.

The example polling service interface 250 may poll the example database 130 to continuously check for ticket information, archived virtual war rooms, and/or other information. In some examples, the polling service interface 250 may continuously check for ticket information, archived virtual war rooms, and/or other information requested via user-submitted social media messages 140*a-c*.

While an example manner of implementing the war room agent 125 is illustrated in FIGS. 1 and 2, one or more of the elements, processes and/or devices illustrated in FIGS. 1 and 2 may be combined, divided, re-arranged, omitted, eliminated and/or implemented in any other way. Further, the example war room generator 240 of FIG. 2 may be implemented by hardware, software, firmware and/or any combination of hardware, software and/or firmware. Thus, for example, the war room generator 240 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example war room generator 240 is hereby expressly defined to include a tangible computer readable storage device or storage disk such as a memory, a digital versatile disk (DVD), a compact disk (CD), a Blu-ray disk, etc. storing the software and/or firmware. Further still, the example war room generator 240 may include one or more elements, processes and/or devices in addition to, or instead of, those illustrated in FIG. 2, and/or may include more than one of any or all of the illustrated elements, processes and devices.

Figure 3:
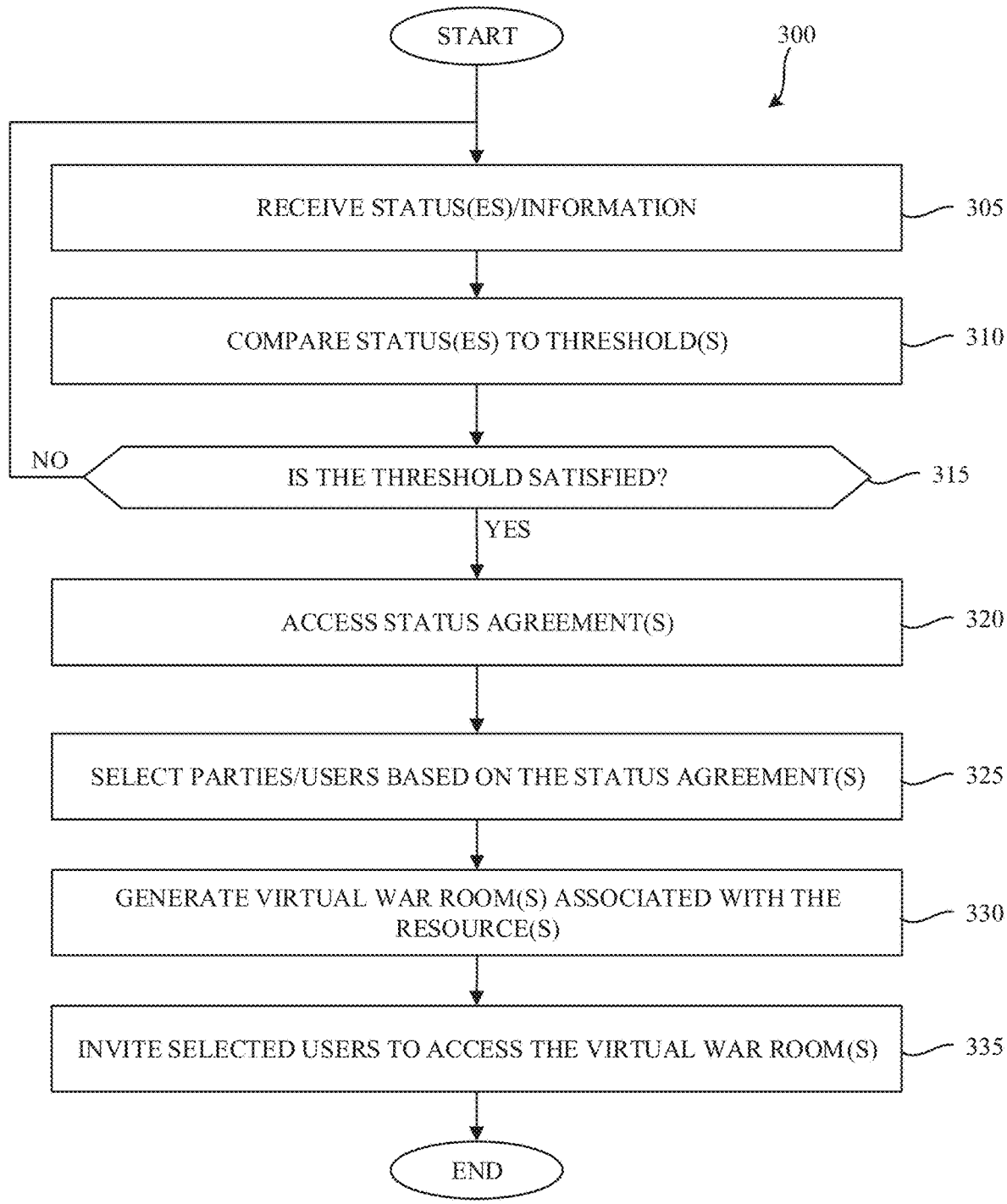
FIG. 3 is a flow chart representative of example machine-readable instructions that may be executed to implement the example war room generator of FIG. 2 to generate virtual war rooms.

A flowchart representative of example machine-readable instructions for implementing aspects of the war room generator 240 of FIG. 2 is shown in FIG. 3. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 3, many other methods of implementing the example war room generator 240 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flowchart representative of example machine-readable instructions that may be executed to implement the example war room generator 240 of FIG. 2. The example program 300 begins when the war room generator 240 receives a status(es) via the example resource connector 215 (FIG. 2) (block 305). In examples disclosed herein, the status includes performance metrics and/or health metrics corresponding to a computing resource 135. In some examples the status may be indicative of bandwidth, throughput, latency, error rate, etc. associated with the computing resource 135. In some examples, the status may be an alert generated by the resource management system 120 such as, for example, a SNMP trap. In examples disclosed herein, the war room generator 240 may access and/or receive status agreements such as, for example, SLAs, stored in the resource management system 120 and determine a threshold. In other examples disclosed herein, thresholds defining a minimum and/or a maximum acceptable computing resource performance(s) and/or health may be stored in the example database 130. In some examples, the example war room generator 240 may analyze thresholds to determine the minimum and/or the maximum acceptable performance and/or health metrics associated with the computing resource 135.

In examples disclosed herein, the example program 300 may also begin when the war room generator 240 receives information indicative of a recurrence(s) of topics and/or tags (block 305). In some examples, the war room generator 240 may receive information indicative of a recurrence(s) of topics and/or tags from the example tag processor 235 (FIG. 2). The information indicative of a recurrence(s) of topics and/or tags may include a value(s) (e.g., a numerical quantity) of topics and/or tags included and/or discussed in social media messages 140*a-c* over a time period. In examples disclosed herein, the war room generator 240 may access and/or receive the status(es) and/or the information indicative of a recurrence of topics and/or tags.

The war room generator 240 compares the status(es) to the threshold (block 310). In some examples, the resource management system 120 determines the threshold is satisfied and sends an alert such as, for example, a SNMP trap, to the war room generator 240 and the example program 300 bypasses block 310 of FIG. 3. In examples disclosed herein, the example war room generator 240 determines whether the status accessed and/or received from the resource management system 120 satisfies the threshold (block 315). For example, if the war room generator 240 determines that the status does not satisfy the threshold (block 315 returns a result of NO), the example war room generator 240 awaits a further status(es).

In examples disclosed herein, the war room generator 240 may also compare the information indicative of a recurrence(s) of topics and/or tags to the threshold (block 310). In some examples, the war room generator 240 may compare the value(s) (e.g., the quantity) of topics and/or tags included in and/or discussed in the social media messages 140a-c to a topic recurrence threshold and/or a tag recurrence threshold. In examples disclosed herein, the example war room generator 240 determines whether the information indicative of a recurrence(s) of topics and/or tags accessed and/or received from the tag processor 235 satisfies the topic recurrence threshold and/or the tag recurrence threshold (block 315). If the war room generator 240 determines that the information indicative of a recurrence(s) of topics and/or tags does not satisfy the threshold (block 315 returns a result of NO), the example war room generator 240 awaits further information indicative of a recurrence(s) of topics and/or tags.

If the war room generator 240 determines that the status(es) does satisfy the threshold (block 315 returns a result of YES), the example war room generator 240 may access a status agreement(s) associated with the status of the computing resource 135 (block 320). However, in some examples, the war room generator 240 accesses the status agreement(s) before determining the status satisfies the threshold and the example program 300 bypasses block 320 of FIG. 3.

Likewise, if the war room generator 240 determines that the information indicative of a recurrence(s) of topics and/or tags satisfies the threshold (e.g., the topic recurrence threshold and/or the tag recurrence threshold) (block 315 returns a result of YES), the example war room generator 240 may access a status agreement(s) corresponding to a computing resource 135 associated with the topic and/or tag (block 320). In some examples, the war room generator 240 accesses the status agreement(s) before determining the information indicative of a recurrence(s) of topics and/or tags satisfies the threshold and the example program 300 bypasses block 320 of FIG. 3.

The example war room generator 240 analyzes the status(es) agreement(s) and selects parties 110a-c and/or users 105a-g based on the status(es) agreement(s) (block 325). In examples disclosed herein the war room generator 240 may access and analyze SLAs to identify parties 110a-c associated with the computing resource 135 (e.g., parties 110a-c responsible for maintaining and troubleshooting the computing resource 135, parties 110a-c that have the computing resource 135 operating in their computing infrastructure, parties 110a-c that designed and/or created the computing resource 135, etc.).

In examples disclosed herein, the example war room generator 240 generates a virtual war room associated with the computing resource (block 330). In some examples, the war room generator 240 may generate the virtual war room by creating communication clients, online message boards, forums, or instant message (IM) chat sessions in the social media network 115. The war room generator 240 generates the virtual war room to resolve complications and/or problems with the computing resource 135. In some examples, the example war room generator 240 may generate the virtual war room and include links, URLs, etc., to archived virtual war rooms in the virtual war room.

In examples disclosed herein, the war room generator 240 invites the selected parties 110a-c and/or users 105a-g to access the virtual war room (block 335). In some examples, the war room generator 240 sends invitations as social media messages 140a-c to the selected parties 110a-c and/or the selected users 105a-g via the example party API 260. In some examples, the war room generator 240 and the example party API 260 may work together to invite new parties 110a-c and/or users 105a-g to, and/or remove existing parties 110a-c and/or users 105a-g from, the virtual war room. After execution of block 335, the example program 300 ends. However, in some examples, the example program 300 may return to block 305 and resume upon receipt of another status(es).

While the illustrated example process 300 of FIG. 3 is represented as a serial procedure (e.g., one status(es) is processed at a time), the example process 300 of FIG. 3 may be implemented in any other fashion. For example, the example process 300 of FIG. 3 may be implemented in a parallel fashion such that multiple status(es) may be processed concurrently. Additionally, the example process 300 of FIG. 3 could be executed and/or performed by a plurality of processors.

Figure 4:
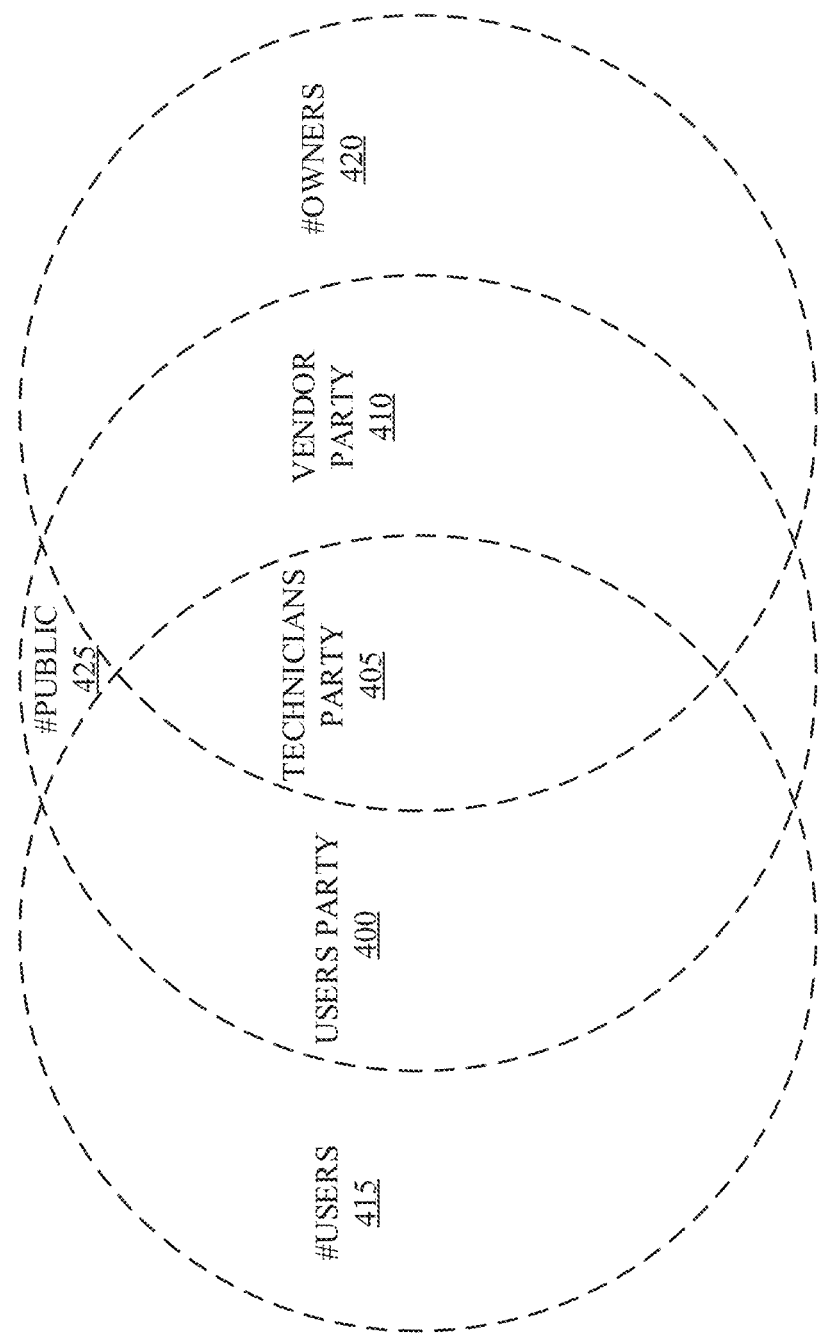
FIG. 4 depicts example tags interpreted by a tag processor of FIG. 2 and example message visibility amongst peer conversation groups in an example virtual war room.

FIG. 4 depicts example tags and message delivery/accessibility relationships between parties 110a-c in a virtual war room. As discussed in connection with FIG. 1, any number and/or type(s) of parties 110a-c may exist in the enterprise network environment. As depicted in the illustrated example of FIG. 4, the example party 110a may be a "Users" party 400 and the example party 110b may be a "Technicians" party 405 of the same business, company, and/or organization. In some examples, the "Users" party represents a department affected by an issue associated with a computing resource 135. In some examples, the "Technicians" party represents a department dedicated to resolving certain complexities of the issue. The example party 110c may be a "Vendor" party 410 of a different business, company, and/or organization. In some examples, the "Vendor" party 410 may be a provider(s) of the computing resource 135 experiencing the issue.

In examples disclosed herein, users 105a-g belonging to the "Users" party 400, the "Technicians" party 405, and/or the "Vendor" party 410 may submit social media messages 140a-c to the virtual war room via the example social media network 115. In some examples, a tag(s) corresponding to the "Users" party 400, the "Technicians" party 405, and/or the "Vendor" party 410 may be included in, or appended to, the social media messages 140a-c to direct the war room agent 125 to deliver the social media messages 140a-c to certain ones of the parties 110a-c. Including a tag(s) corresponding to the "Users" party 400, the "Technicians" party 405, and/or the "Vendor" party 410 may also display certain ones of the social media messages 140a-c to certain ones of the users 105a-g and/or parties 110a-c in the virtual war room.

In the illustrated example of FIG. 4, the tag, "# USERS" 415, corresponds to the "Users" party 400 and the "Technicians" party 405 whereas the tag, "# OWNERS" 420, corresponds to the "Technicians" party 405 and the "Vendor" party 410. By default, in the illustrated example of FIG. 4, users 105a-g of parties 110a-c may cause the war room agent 125 to deliver social media messages 140a-c to, and/or display social media messages 140a-c for, other ones of the users 105a-g of the same party 110a-c without including a tag(s) in the social media messages 140a-c. For example a user 105a-g belonging to the "Technicians" party 405 may deliver social media messages 140a-c to other ones of the users 105a-g belonging to the "Technicians" party 405, by default, without including a tag indicative of the delivery of the social media message 140a-c to ones of the parties 400-410. However, if the user 105a-g belonging to the "Technicians" party 405 wishes to deliver the social media messages 140a-c to different ones of the parties 110a-c (e.g., the "Users" party 400 and/or the "Vendor" party 410), the user 105a-g must include a tag(s) associated with the parties 110a-c in which they wish to deliver. For example, if a user 105a-g belonging to the "Technicians" party 405 wishes to deliver a social media message 140a-c, via the war room agent 125, to users 105a-g of the "Users" party 400 and the "Technicians" party 405, the user 105a-g includes the "# USERS" 415 tag in the social media message 140a-c. Additionally, if the user 105a-g belonging to the "Technicians" party 405 wishes to deliver a social media message 140a-c, via the war room agent 125, to users 105a-g of the "Vendor" party 410 and the "Technicians" party 405, the user 105a-g includes the "# OWNERS" 420 tag in the social media message 140a-c.

In the illustrated example of FIG. 4, ones of the users 105a-g belonging to the "Users" party 400, the "Technicians" party 405, and/or the "Vendor" party 410 may deliver social media messages 140a-c to each of the "Users" party 400, the "Technicians" party 405, and/or the "Vendor" party 410 by including a tag(s) directed to all of the parties in the social media messages 140a-c. For example, in the illustrated example of FIG. 4, if a user 140a-c belonging to the "Users" party 400 includes tag, "# PUBLIC" 425, in the social media message 140a-c, the social media message 140a-c is delivered to the users 105a-g of the "Users" party 400, the "Technicians" party 405, and the "Vendor" party 410. In other examples, if a user belonging to the "Technicians" party 405 or the "Vendor" party 410 includes the tag, "# PUBLIC" 425, in the social media message 140a-c, the social media message 140a-c is delivered to the users 105a-g of the "Users" party 400, the "Technicians" party 405, and the "Vendor" party 410.

FIG. 5 illustrates how the war room agent 125 delivers and reveals messages to the parties 110a-c described in the description of FIG. 4 in a virtual war room. In the illustrated example of FIG. 5, a virtual war room 500 is a communication client, a message board, a forum, or an instant message chat session that is generated by the example war room agent 125 to resolve a computing issue. The "Users" party 400, the "Technicians" party 405, and the "Vendor" party 410 of FIG. 4 depict the parties 110a-c selected and invited by the war room agent 125 to access the virtual war room 500.

In the illustrated example of FIG. 5, users 105a-g of the "Users" party 400, the "Technicians" party 405, and the "Vendor" party 410 post social media messages 140a-c to the virtual war room 500 via the example social media network 115. The social media messages 140a-c are scanned for a tag(s) associated with the corresponding "Users" party 400, the "Technicians" party 405, and the "Vendor" party 410 by the example message API 255 and/or tag processor 235 (FIG. 2). Upon identification of the tag(s) in the social media message 140a-c, the war room generator 240 (FIG. 2), in accordance with the message API 255, delivers the social media message 140a-c to ones of the parties 400-410. In the illustrated example of FIG. 5, ones of the social media messages 140a-c may or may not be accessible or viewable in the virtual war room by ones of the parties 400-410 due to inclusion of the tag(s) in the social media message 140a-c.

In the illustrated example of FIG. 5, a user 105a-g (depicted as "User 1") of the "Users" party 400 posts social media message 505 to the social media network 115. Social media message 505 contains tags "# Incident," "@Fileshare," and "# PUBLIC" 430. In some examples, tag processor 235 of the war room agent 125 interprets the tag "# Incident" and "@Fileshare" and automatically logs the social media message 505 as ticket information, corresponding to a "Fileshare" application, in the resource management system 120 and/or the database 130. Additionally, the tag processor 235 identifies the tag "# PUBLIC" 425 and determines the social media message 505 should be posted to, and/or viewable by, the "Technicians" party 405 and the "Vendor" party 410 as described in the example of FIG. 4. Additionally, the tag processor 235 determines the social media message 505 should be posted to, and/or viewable by, other ones of the users 105a-g of the "Users" party 400, by default. Subsequently, the war room generator 240, in accordance with the message API 255, delivers message 505 to users 105a-g of the "Users" party 400, the "Technicians" party 405 and the "Vendor" party 410 of the virtual war room, illustrated in FIG. 5. The example message 505 is viewable by all of the parties 400-410 in the virtual war room.

A user 105a-g (depicted as "Technician 1") of the "Technicians" party 405 posts social media message 510 to the social media network 115. Social media message 510 contains tags "@Fileshare" and "# USERS" 415. In some examples the tag processor 235 interprets the tag "@Fileshare" and determines the user 105a-g is discussing the "Fileshare" application. The tag processor 235 also identifies and interprets the tag "# USERS" 415 and determines the social media message should be posted to the "Users" party 400 and the "Technicians" party 405 (e.g., all messages posted by users 105a-g of the "Technicians" party 405 are delivered to and viewable by any of the users 105a-g belonging to the "Technicians" party 405). Like message 505, message 510 is delivered by the war room generator 240, in accordance with the message API 255, to the users 105a-g of the "Users" party 400 and the "Technicians" party 405 in the virtual war room.

In the illustrated example of FIG. 5, the example war room generator 240 of the example war room agent 125 (appearing as an autonomous enterprise network user, Marvin) delivers message 515 to users 105a-g of the "Users" party 400, "Technicians" party 405, and "Vendor" party 410. The message 515 of FIG. 5 includes a URL to archived war rooms associated with the "Fileshare" application. In other examples, the war room agent 125 may deliver links, URLs, etc. to certain ones of the users 105a-g and/or the parties 400-410.

Messages 520, 525, 530, and 535 of FIG. 5 illustrate how the war room agent 125 delivers a social media message 140a-c to default parties 400-410 when a tag, indicative of delivery of the social media message 140a-c to ones of the parties 400-410, is not included in the social media message 140a-c. Messages 520, 525, 530, and 535 also illustrate how the war room agent 125 delivers a social media message 140a-c to default parties 400-410 when a tag(s), such as the tag, "#," is not included in the social media message 140*a-c*. In FIG. 5, messages 520, 525, 530, and 535 do not include a tag(s) indicative of message delivery to certain ones of the parties 400-410. By default, the tag processor 235 directs the message API 255 to display messages 520, 525, 530, and 535 in the virtual war room to ones of the parties 400-410 that the user 105*a-g* belongs to. For example, message 520 is posted by an example user 105*a-g* (depicted as "Technician 1") of the "Technicians" party 405. Message 520 does not include a tag(s) suggesting message delivery to others ones of the parties 400-410, and the war room agent 125, by default, reveals message 520 to users 105*a-g* of the "Technicians" party 405 only. A different user 105*a-g* (depicted as "Technician 2") of the "Technicians" party 405 reviews message 520 and posts message 525 in response. Like message 520, message 525, by default, is revealed only to the users 105*a-g* of the "Technicians" party 405. Likewise, messages 530 and 535 are posted by users 105*a-g* (depicted as "Vendor Technician 1" and "Vendor Technician 2") of the "Vendor" party 410 and revealed only to users 105*a-g* of the "Vendor" party 410.

In the illustrated example of FIG. 5, messages 540, 545, and 550 include tags. Message 540 is posted by a user 105*a-g* (depicted as Technician 2) of the "Technicians" party 405 and includes tag "# OWNERS" 420. The tag 420 causes the war room agent 125 to deliver message 540 to the "Technicians" party 405, by default, and the "Vendor" party 410. Message 545 is also posted by the user 105*a-g* (Technician 2) of the "Technicians" party 405 and includes tag "# PUBLIC" 425. The tag 425 causes the war room agent to deliver message 545 to the "Users" party 400, the "Vendor" party 410, and, by default, the "Technicians" party 405. Message 550 is posted by a user 105*a-g* (depicted as User 1) of the "Users" party 400 and includes tag "# USERS" 415. The tag 415 causes the war room agent to deliver message 550 to the "Technicians" party 405 and, by default, the "Users" party 400 as defined in the description of FIG. 4.

While an example manner of implementing the war room agent 125 is illustrated in FIGS. 1 and 2, one or more of the elements, processes and/or devices illustrated in FIGS. 1 and 2 may be combined, divided, re-arranged, omitted, eliminated and/or implemented in any other way. Further, the example tag processor 235, the example war room generator 240, and the example message API 255 of FIG. 2 may be implemented by hardware, software, firmware and/or any combination of hardware, software and/or firmware. Thus, for example, the example tag processor 235, the example war room generator 240, and the example message API 255 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example tag processor 235, the example war room generator 240, and the example message API 255 are hereby expressly defined to include a tangible computer readable storage device or storage disk such as a memory, a digital versatile disk (DVD), a compact disk (CD), a Blu-ray disk, etc. storing the software and/or firmware. Further still, the example tag processor 235, the example war room generator 240, and the example message API 255 may include one or more elements, processes and/or devices in addition to, or instead of, those illustrated in FIG. 2, and/or may include more than one of any or all of the illustrated elements, processes and devices.

Figure 6:
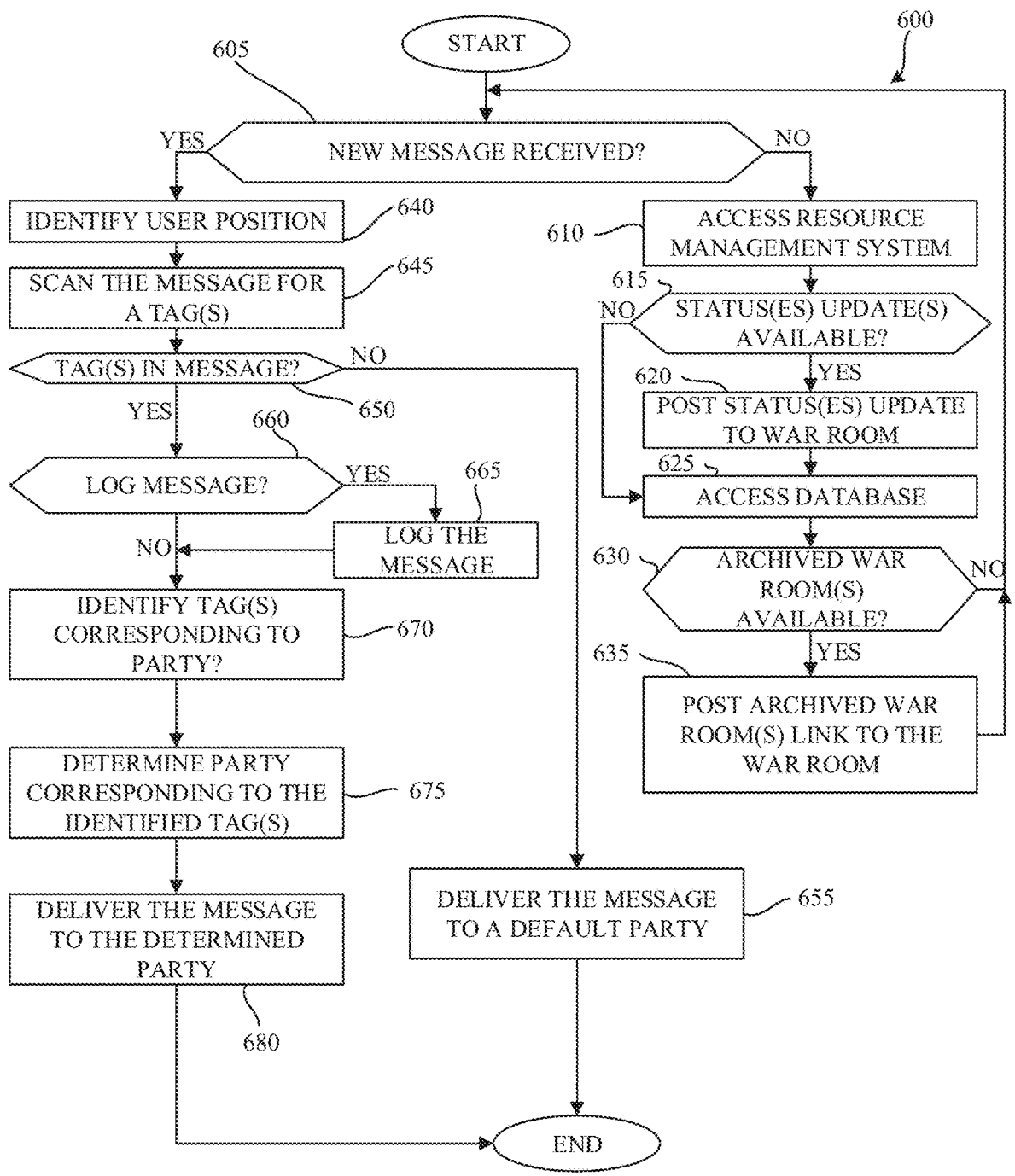
FIG. 6 is a flow chart representative of example machine-readable instructions that may be executed by the tag processor and the war room generator of FIG. 2 to manage the delivery of messages to peer conversation groups in an example virtual war room.

A flowchart representative of example machine-readable instructions for implementing the example tag processor 235, the example war room generator 240, and the example message API 255 of FIG. 2 is shown in FIG. 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example tag processor 235, the example war room generator 240, and the example message API 255 may alternatively be used. For example, the order of execution of the blocks may be changed, and/or some of the blocks described may be changed, eliminated, or combined.

As mentioned above, the example processes of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart representative of example machine-readable instructions 600 that may be executed to manage the delivery of messages to example parties 110*a-c* in a virtual war room of the enterprise network environment 100. The example program 600 begins when the example message API 255 determines whether a new social media message 140*a-c* has been received from a user 105*a-g* that has access to the virtual war room (block 605). If a new message has not been received (block 605 returns a result of NO), the resource connector 215 accesses the resource management system 120 (FIGS. 1 and 2) (block 610). The war room generator 240, in accordance with the resource connector 215, determines whether status updates are available (block 615). For example, the war room generator 240, in accordance with the resource connector 215, may analyze performance and/or health metrics, associated with a computing resource 135 experiencing issues, in the resource management system 120. The war room generator 240, in accordance with the resource connector 215, may determine whether a new (e.g., more recent) status is available. If a status update is available (block 615 returns a result of YES), the example war room generator 240, in accordance with the message API 255, posts the status update via a social media message 140*a-c* to the virtual war room (block 620). Subsequently, the war room generator 240, in accordance with the message API 255, accesses the example database (block 255). However, if a status update is not available (block 615 returns a result of NO), the example program 600 bypasses block 620 and the example war room generator 240, in accordance with the message API 255, accesses the example database 130 (block 625).

In examples disclosed herein, the war room generator 240 determines whether the example database 130 stores archived virtual war rooms associated with the computing resource 135 (block 630). If the example database 130 does not store any relevant (e.g., associated with the computing resource 135), archived virtual war rooms and/or if archived virtual war rooms are not available (block 630 returns a result of NO), the example program 600 may return to block 605. However, if the example database 130 does store relevant, archived virtual war rooms and/or if archived virtual war rooms are available (block 630 returns a result of YES), the war room generator 240, in accordance with the example message API 255, posts a link, URL, etc. to the archived virtual war rooms in the virtual war room (block 635). The archived virtual war rooms may be accessed by users 105*a-g* of the virtual war room. The example program 600 may subsequently return to block 605. In examples disclosed herein, if a new message has not been received, the example program 600 may iteratively execute blocks 610, 615, 620, 625, 630, and 635 any number of times. In examples disclosed herein, if a new message has not been received, the example program may bypass any ones or all of blocks 610, 615, 620, 625, 630, and 635 and wait until a new message is received.

In examples disclosed herein, if a new message has been received (block 605 returns a result of YES), the example tag processor 235 identifies an occupational position (e.g., a job title, a company ranking, an employment status, etc.) of a user 105*a-g* that submitted the message (block 640). In examples disclosed herein, the tag processor 235 may identify an occupational position such as, for example, a job title of the user 105*a-g* that submitted the message. Subsequently, the example tag processor 235 scans the message for a tag(s) (block 645). In some examples, the tag processor 235 scans a user-submitted social media message 140*a-c*. The example tag processor 235 subsequently determines whether a tag(s) is included in, and/or appended to, the new message (block 650). The tag processor may determine whether a tag(s) is included in, and/or appended to, the new message by identifying tags such as "#" and "@" discussed previously. If the tag processor 235 determines the new message does not include a tag(s) (block 650 returns a result of NO), the example war room generator 240, in accordance with the message API 255, delivers the new message to a party 110*a-c* in which the user 105*a-g* that submitted the new message belongs to (block 655). For example, the war room generator 240, in accordance with the example message API 255 may, by default, deliver the new message, submitted by a user 105*a-g* of the "Users" party 400 of FIG. 4, to all other users 105*a-g* of the "Users" party 400. In examples disclosed herein, the war room generator 240, in accordance with the message API 255 may, by default, deliver the new message, to other ones of the users 105*a-g* characterized by the same occupational position as the user 105*a-g* who submitted the message. In examples disclosed herein, other ones of the users 105*a-g* characterized by the same occupational position as the user 105*a-g* who submitted the message may be ones of the parties 110*a-c* of the enterprise network environment.

In examples disclosed herein, if the new message includes a tag(s) (block 650 returns a result of YES), the example tag processor 235 may determine whether the new message includes a tag directed to logging ticket information (block 660). For example, the tag processor 235 may determine whether the tag "# Incident," discussed previously with respect to FIG. 1, is included in the new message. If the tag processor 235 determines a tag directed to logging ticket information is included in the new message (block 660 returns a result of YES), the example ticket tracker 230 may log the new message (block 665) in the example database 130 and/or the example resource management system 120. In examples disclosed herein, the example program 600 may not include and/or bypass blocks 660 and 665.

The example tag processor 235 subsequently identifies a tag(s) corresponding to ones of the parties 110*a-c* (block 670). In some examples, the tag processor 235 may identify the tags described in the description of FIG. 4. In some examples, block 665 includes identifying a tag(s) associated with a computing resource 135. The example tag processor 235 may subsequently determine the party 110*a-c* corresponding to the tag(s) (block 675). For example the tag processor 235 may determine the tag "# USERS" 415 corresponds to the "Users" party 400 and the "Technicians" party 405, as depicted in the description of FIG. 4. In examples disclosed herein, the example tag processor 235 may also determine the party 110*a-c* corresponding to the tag(s) based on the occupational position of the user 105*a-g* that submitted the message. For example, the tag processor 235 may analyze the job title of the user 105*a-g* and determine the party 110*a-c* corresponding to the tag(s). The war room generator 240, in accordance with the message API 255, may subsequently deliver the new message to ones of the parties 110*a-c* corresponding to the tag(s) (block 680). In some examples, the example process of FIG. 6 ends after block 680. In such examples, the example process of FIG. 6 may resume upon receiving a new electronic message.

Figure 7:
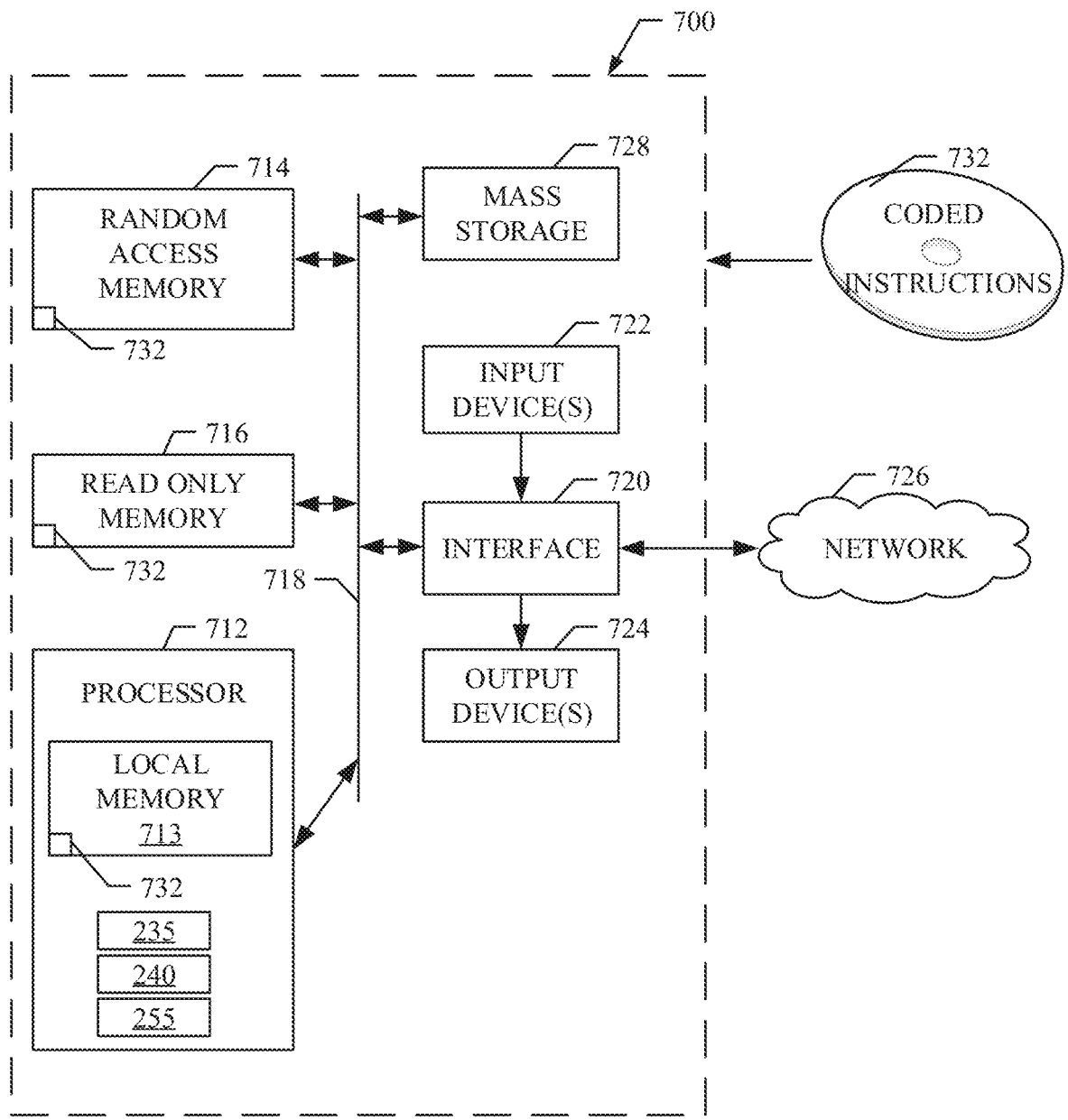
FIG. 7 is an example processor platform that may be used to execute the example machine-readable instructions of FIGS. 3 and 6.

FIG. 7 is a block diagram of an example processor platform 1000 capable of executing the instructions of FIGS. 3 and 6 to implement the example tag processor 235, the example war room generator 240, and the example message API 255 of FIG. 2. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. In the illustrated example, the processor 712 implements the example tag processor 235, the example war room generator 240, and the example message API 255 of FIG. 2.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 3 may be stored in the mass storage device 728, in the volatile memory 714, in the non-volatile memory 716, and/or on a removable tangible computer readable storage medium such as a CD or DVD.

From the foregoing, it will appreciated that the above disclosed methods, apparatus and articles of manufacture facilitate generating communication clients based on statuses received from a resource management system. Generating the communication clients to support collaboration enables faster issue resolution.

Additionally, it will be appreciated that the above-disclosed examples facilitate managing the delivery of messages in an enterprise network environment. Managing the delivery of messages protects the confidentiality of conversations in communication clients.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to generate a communication client in an enterprise network environment, the method comprising:
  accessing, with a processor, a value indicative of a quantity of tags included in a plurality of social media messages, the tags indicative of a computing resource of the enterprise network environment;
  comparing, with the processor and using a computer-executable process, the value to a threshold quantity of tags;
  in response to: (a) a comparison of a status of a health of the computing resource to a status threshold indicative of a minimum acceptable health status, and (b) the value indicative of the quantity of tags satisfying the threshold quantity of tags:
    selecting, with the processor, a plurality of users based on a status agreement;
    generating, with the processor, a communication client pertaining to the computing resource; and
  inviting, with the processor, the selected plurality of users to access the communication client, the selected plurality of users invited via a social media interface.

2. The method as defined in claim 1, wherein the status agreement is a service level agreement defining the status threshold and the plurality of users associated with the computing resource.

3. The method as defined in claim 2, wherein the status agreement is established between an enterprise network provider and a consumer.

4. The method as defined in claim 2, wherein the selecting of the plurality of users based on the status agreement includes accessing, with the processor, the status agreement and analyzing, with the processor, the status agreement to identify the plurality of users.

5. The method as defined in claim 1, wherein the threshold quantity of tags defines the quantity of tags received in a time period.

6. The method of claim 1, further including analyzing the plurality of social media messages for a recurrence of a type of tag to identify the value indicative of the quantity of tags.

7. The method of claim 1, further including accessing a value indicative of a quantity of topics included in the plurality of social media messages, the value compared to a threshold quantity of topics to generate the communication client pertaining to the topic.

8. An apparatus to generate a communication client in an enterprise network environment, the apparatus comprising:
  a war room generator to:
    access a value indicative of a quantity of tags included in a plurality of social media messages, the tags indicative of a computing resource of the enterprise network environment;
    compare using a computer-executable process, the value to a threshold quantity of tags;
    in response to: (a) a comparison of a status of a health of the computing resource to a status threshold indicative of a minimum acceptable health status, and (b) the value indicative of the quantity of tags satisfying the threshold quantity of tags:

select a plurality of users based on a status agreement; and generate a communication client pertaining to the computing resource; and a social media interface to deliver invitations to the selected plurality of users to access the communication client.

9. The apparatus as defined in claim 8, wherein the status agreement is to be a service level agreement defining the status threshold and the plurality of users associated with the computing resource.

10. The apparatus as defined in claim 9, wherein the status agreement is to be established between an enterprise network provider and a consumer.

11. The apparatus as defined in claim 9, wherein the war room generator is to select the plurality of users by accessing the status agreement and by analyzing the status agreement to identify the plurality of users.

12. The apparatus as defined in claim 8, wherein the threshold quantity of tags defines the quantity of tags received in a time period.

13. The apparatus of claim 8, further including a tag processor to analyze the plurality of social media messages for a recurrence of a type of tag to identify the value indicative of the quantity of tags.

14. The apparatus of claim 8, wherein the war room generator is to access a value indicative of a quantity of topics included in the plurality of social media messages, the value compared to a threshold quantity of topics to generate the communication client pertaining to the topic.

15. A non-transitory computer readable medium comprising computer readable instructions that, when executed, cause at least one processor to at least:

access a value indicative of a quantity of tags included in a plurality of social media messages, the tags indicative of a computing resource of an enterprise network environment;

compare, the value to a threshold quantity of tags;

in response to: (a) a comparison of a status of a health of the computing resource to a status threshold indicative of a minimum acceptable health status, and (b) the value indicative of the quantity of tags satisfying the threshold quantity of tags:

select a plurality of users based on a status agreement;

generate a communication client pertaining to the computing resource; and invite the selected plurality of users to access the communication client, the selected plurality of users invited via a social media interface.

16. The non-transitory computer readable medium as defined in claim 15, wherein the status agreement is a service level agreement defining the status threshold and the plurality of users associated with the computing resource.

17. The non-transitory computer readable medium as defined in claim 16, wherein the status agreement is established between an enterprise network provider and a consumer.

18. The non-transitory computer readable medium as defined in claim 16, wherein the instructions, when executed, cause the processor to select the plurality of users by accessing the status agreement and by analyzing the status agreement to identify the plurality of users.

\* \* \* \* \*